US011902942B2

(12) United States Patent
Wu et al.

(10) Patent No.: US 11,902,942 B2
(45) Date of Patent: Feb. 13, 2024

(54) METHOD AND DEVICE IN UE AND BASE STATION FOR WIRELESS COMMUNICATION

(71) Applicants: Lu Wu, Shanghai (CN); Xiaobo Zhang, Shanghai (CN); Lin Yang, Shanghai (CN)

(72) Inventors: Lu Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/135,200

(22) Filed: Apr. 17, 2023

(65) Prior Publication Data

US 2023/0254825 A1    Aug. 10, 2023

Related U.S. Application Data

(63) Continuation of application No. 17/500,955, filed on Oct. 14, 2021, now Pat. No. 11,671,944, which is a
(Continued)

(30) Foreign Application Priority Data

Nov. 23, 2018    (CN) .......................... 201811408238.2

(51) Int. Cl.
*H04W 72/04*    (2023.01)
*H04L 5/00*    (2006.01)
(Continued)

(52) U.S. Cl.
CPC .......... *H04W 72/04* (2013.01); *H04L 1/0057* (2013.01); *H04L 1/0058* (2013.01);
(Continued)

(58) Field of Classification Search
CPC . H04W 72/04; H04W 72/0446; H04W 72/43; H04L 5/0094; H04L 5/0091; H04L 1/1812
See application file for complete search history.

(56) References Cited

U.S. PATENT DOCUMENTS 10,972,237 B2\*    4/2021  Guo ...................... H04L 5/0048
11,184,882 B2\*    11/2021  Wu ........................ H04L 1/0058
(Continued)

FOREIGN PATENT DOCUMENTS

CN    104394574 A    3/2015
CN    106982468 A    7/2017
(Continued)

OTHER PUBLICATIONS

CN201811408238.2 First Search Report dated Jan. 25, 2022.
(Continued)

*Primary Examiner* — Raj Jain

(57) ABSTRACT

The disclosure provides a method and a device in a User Equipment (UE) and a base station for wireless communication. The UE receives a first signaling. Transmits K radio signals and a first bit block in K time-frequency resource groups. The first signaling is used for determining a first time-frequency resource group. The first time-frequency resource group is reserved to transmission of a first bit block;
(Continued)

time-domain resources occupied by the first time-frequency resource group are overlapping with time-domain resources occupied by at least one of the K time-frequency resource groups, and any two of the K time-frequency resource groups are orthogonal in time domain; the first bit block is transmitted in only K1 time-frequency resource group(s) among the K time-frequency resource groups; the first signaling corresponds to a first type or a second type is used for determining the K1 time-frequency resource group(s) from the K time-frequency resource groups.

20 Claims, 8 Drawing Sheets

Related U.S. Application Data continuation of application No. 16/689,095, filed on Nov. 20, 2019, now Pat. No. 11,184,882.

(51) Int. Cl.
  *H04L 1/00*  (2006.01)
  *H04L 1/1812*  (2023.01)
(52) U.S. Cl.
  CPC .......... *H04L 1/1812* (2013.01); *H04L 5/0016* (2013.01); *H04L 5/0091* (2013.01)

(56) References Cited

U.S. PATENT DOCUMENTS

| 11,671,944 | B2* | 6/2023 | Wu | ........................ H04L 5/0053 |
|---|---|---|---|---|
| | | | | 370/330 |
| 2015/0244485 | A1 | 8/2015 | Nguyen et al. | |
| 2019/0200378 | A1* | 6/2019 | Ko | ........................ H04W 72/23 |
| 2019/0261335 | A1* | 8/2019 | Peng | ......................... H04L 5/00 |
| 2019/0319743 | A1* | 10/2019 | Wang | ...................... H04L 1/007 |
| 2020/0119881 | A1* | 4/2020 | Xia | ........................... H04L 1/00 |
| 2021/0160882 | A1* | 5/2021 | Jiang | .................... H04L 5/0094 |
| 2021/0218539 | A1* | 7/2021 | Hu | ....................... H04L 5/0094 |
| 2021/0328644 | A1* | 10/2021 | Hao | ..................... H04L 5/0057 |
| 2023/0254825 | A1* | 8/2023 | Wu | ....................... H04L 5/0016 |
| | | | | 370/330 |

FOREIGN PATENT DOCUMENTS

| CN | 106993332 A | 7/2017 |
|---|---|---|
| CN | 107534545 A | 1/2018 |

OTHER PUBLICATIONS

CN201811408238.2 1st Office Action dated Jan. 30, 2022.
3GPP tsg_ran\wg1_rl1 Qualcomm Incorporated R1-1809953_TP Processing-Time-UCI TPs for 38.213-214_v5 (Aug. 24, 2018).
3GPP tsg_ran\wg1_rl1 Ericsson "R1-1812009 Maintenance Issues Short and PUCCH Multiplexing" (Oct. 11, 2018).

* cited by examiner

| If first signaling corresponds to first type | MCS employed by first radio signal belongs to first MCS set |
|---|---|
| If first signaling corresponds to second type | MCS employed by first radio signal belongs to second MCS set |

Target BLER of first MCS set < Target BLER of second MCS set

FIG.8

|  | K1 is predefined |
|---|---|
| or | K1 is configurable |
| or | The number of bits included in the first bit block is used for determining K1 |

FIG.9

METHOD AND DEVICE IN UE AND BASE STATION FOR WIRELESS COMMUNICATION

CROSS-REFERENCE TO RELATED APPLICATION

This application is a continuation of the U.S. patent application Ser. No. 17/500,955, filed on Oct. 14, 2021, which is a continuation of the U.S. patent application Ser. No. 16/689,095, filed on Nov. 20, 2019, claims the priority benefit of Chinese Patent Application Serial Number 201811408238.2, filed on Nov. 23, 2018, the full disclosure of which is incorporated herein by reference.

BACKGROUND

Technical Field

The disclosure relates to transmission methods and devices in wireless communication systems, and in particular to a communication method and a communication device supporting data transmission on unlicensed spectrum.

Related Art

In 5G systems, Enhance Mobile Broadband (eMBB) and Ultra Reliable and Low Latency Communication (URLLC) are two typical service types. A new Modulation and Coding Scheme (MC S) table has been defined for requirements of lower target BLER ($10^{-5}$) of URLLC services in the 3rd Generation Partner Project (3GPP) New Radio (NR) Release 15.

In order to support URLLC services of higher requirements, for example, higher reliability (eg. target BLER is $10^{-6}$), lower latency (eg. 0.5-1 ms), etc., the 3GPP Radio Access Network (RAN) #80 session had approved a Study Item (SI) of URLLC enhancement of NR Release 16, in which enhancements to Hybrid Automatic Repeat reQuest (HARM) feedback/Channel State Information (CSI) feedback are a key point to be studied.

SUMMARY

The inventor finds through researches that Uplink Control Information (UCI) includes HARQ/CSI, when one PUCCH reserved to a UCI is not orthogonal to a PUSCH in time domain, in order to support the transmission of higher reliability in NR Release 16, how to transmit a UCI is a key problem to be reconsidered.

In view of the above problems, the disclosure provides a solution. It should be noted that the embodiments of the disclosure and the characteristics in the embodiments may be mutually combined arbitrarily if no conflict is incurred.

The disclosure provides a method in UE for wireless communication, wherein the method includes:

receiving a first signaling, the first signaling being used for determining a first time-frequency resource group, and the first time-frequency resource group being reserved to transmission of a first bit block; and transmitting K radio signals and the first bit block in K time-frequency resource groups.

Herein, time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

In one embodiment, the problem to be solved by the disclosure is: how to enhance the transmission of a UCI when a PUCCH is not orthogonal to a PUSCH in time domain, in view of the requirements of higher reliability in NR Release 16.

In one embodiment, the problem to be solved by the disclosure is that: in current standards, when a PUCCH reserved to transmit a UCI is not orthogonal to one PUSCH in time domain, the transmission of the UCI is changed onto the PUSCH. In NR Release 16, one PUSCH probably occupies few time-domain resources, for example, one or several multicarrier symbols, there might be multiple PUSCHs transmitted in one same timeslot of one same carrier or in one same subframe, and the multiple PUSCHs may be multiple repeated transmissions of one Transport Block (TB) or may be transmissions of multiple different TBs; when a UCI is not orthogonal to at least one of the multiple PUSCHs, on which of the PUSCHs the UCI is to be transmitted is a key problem to be reconsidered.

In one embodiment, the problem to be solved by the disclosure is that: in current standards, when a PUCCH reserved to transmit a UCI is not orthogonal to one PUSCH in time domain, the transmission of the UCI is changed onto the PUSCH. In NR Release 16, one URLLC PUSCH probably occupies few time-domain resources, for example, one or several multicarrier symbols, there might be multiple URLLC PUSCHs transmitted in one same timeslot of one same carrier or in one same subframe, and the multiple URLLC PUSCHs may be multiple repeated transmissions of one TB or may be transmissions of multiple different TBs; since an eMBB UCI and a URLLC UCI have different requirements on transmission latency, when a UCI is not orthogonal to at least one of the multiple URLLC PUSCHs, a service type corresponding to the UCI needs to be considered when determining on which of the PUSCHs the UCI is to be transmitted.

In one embodiment, the essence of the above method is that: the first time-frequency resource group is a PUCCH, the K time-frequency resource groups are K PUSCHs, the first bit block is a UCI, the PUCCH is not orthogonal to at least one of the K PUSCHs, the first type corresponds to URLLC services, and the second type corresponds to eMBB services. The above method has the following benefits: on which of the PUSCHs the UCI is to be transmitted is determined according to the service type corresponding to the UCI.

According to one aspect of the disclosure, the above method is characterized in that: when the first signaling corresponds to the first type, the K1 time-frequency resource group(s) is(are) K1 earliest time-frequency resource group(s) in time domain among K2 time-frequency resource group(s) respectively; each of the K2 time-frequency resource group(s) is one of the K time-frequency resource groups, and the K2 is a positive integer not less than the K1 but not greater than the K; the K2 is equal to the K and the K2 time-frequency resource groups are the K time-frequency resource groups respectively; or, the K2 time-frequency resource group(s) is(are) all time-frequency resource groups overlapping with the first time-frequency resource group in time domain among the K time-frequency resource groups.

In one embodiment, the essence of the above method is that: K2 time-frequency resource group(s) is(are) K2 PUSCH(s) among the K PUSCHs, and a URLL UCI is transmitted on K1 earliest PUSCH(s) in time domain among the K2 PUSCH(s). The above method has the following benefits: the transmission low latency of the URLLC UCI is guaranteed.

According to one aspect of the disclosure, the above method is characterized in that: when the first signaling corresponds to the second type, the K1 time-frequency resource group(s) is(are) K1 latest time-frequency resource group(s) in time domain among K3 time-frequency resource group(s) respectively; each of the K3 time-frequency resource group(s) is one of the K time-frequency resource groups, and the K3 is a positive integer not less than the K1 but not greater than the K; the K3 is equal to the K and the K3 time-frequency resource groups are the K time-frequency resource groups respectively; or, the K3 time-frequency resource group(s) is(are) all time-frequency resource groups overlapping with the first time-frequency resource group in time domain among the K time-frequency resource groups.

In one embodiment, the essence of the above method is that: the K time-frequency resource groups are K URLLC PUSCHs respectively; in order to guarantee the transmission high reliability of the URLLC PUSCH, the K URLLC PUSCHs are repeated transmissions of one same TB respectively, the K3 time-frequency resource group(s) is(are) K3 PUSCH(s) among the K URLLC PUSCHs, and an eMBB UCI is transmitted on K1 latest PUSCH(s) in time domain among the K3 PUSCH(s). The above method has the following benefits: when K3 is greater than K1, the eMBB UCI does not affect the transmission of the (K3−K1) earliest PUSCH(s) among the K3 PUSCH(s), and a receiving terminal may parse the TB relatively early based on multiple repeated transmissions; therefore, this method is beneficial to the transmission low latency of the URLLC PUSCH.

According to one aspect of the disclosure, the above method includes:

receiving a first radio signal.

Herein, the first bit block is related to the first radio signal.

According to one aspect of the disclosure, the above method is characterized in that: the first bit block is used for indicating whether the first radio signal is correctly received; when the first signaling corresponds to the first type, the first signaling is used for indicating an MCS employed by the first radio signal from a first MCS set; when the first signaling corresponds to the second type, the first signaling is used for indicating an MCS employed by the first radio signal from a second MCS set; and a target BLER of the first MCS set is less than a target BLER of the second MCS set.

According to one aspect of the disclosure, the above method is characterized in that: the K1 is predefined, or the K1 is configurable, or a number of bits included in the first bit block is used for determining the K1.

According to one aspect of the disclosure, the above method includes:

receiving K0 piece(s) of information.

Herein, the K0 piece(s) of information is(are) used for determining the K time-frequency resource groups, and the K0 is a positive integer not greater than the K; the K0 is equal to the K and the K0 pieces of information are used for determining the K time-frequency resource groups respectively, or, the K0 is equal to 1 and a second bit block is used for generating any one of the K radio signals.

The disclosure provides a method in a base station for wireless communication, wherein the method includes:

transmitting a first signaling, the first signaling being used for determining a first time-frequency resource group, and the first time-frequency resource group being reserved to transmission of a first bit block; and receiving K radio signals and the first bit block in K time-frequency resource groups.

Herein, time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

According to one aspect of the disclosure, the above method is characterized in that: when the first signaling corresponds to the first type, the K1 time-frequency resource group(s) is(are) K1 earliest time-frequency resource group(s) in time domain among K2 time-frequency resource group(s) respectively; each of the K2 time-frequency resource group(s) is one of the K time-frequency resource groups, and the K2 is a positive integer not less than the K1 but not greater than the K; the K2 is equal to the K and the K2 time-frequency resource groups are the K time-frequency resource groups respectively; or, the K2 time-frequency resource group(s) is(are) all time-frequency resource groups overlapping with the first time-frequency resource group in time domain among the K time-frequency resource groups.

According to one aspect of the disclosure, the above method is characterized in that: when the first signaling corresponds to the second type, the K1 time-frequency resource group(s) is(are) K1 latest time-frequency resource group(s) in time domain among K3 time-frequency resource group(s) respectively; each of the K3 time-frequency resource group(s) is one of the K time-frequency resource groups, and the K3 is a positive integer not less than the K1 but not greater than the K; the K3 is equal to the K and the K3 time-frequency resource groups are the K time-frequency resource groups respectively; or, the K3 time-frequency resource group(s) is(are) all time-frequency resource groups overlapping with the first time-frequency resource group in time domain among the K time-frequency resource groups.

According to one aspect of the disclosure, the above method includes:

transmitting a first radio signal.

Herein, the first bit block is related to the first radio signal.

According to one aspect of the disclosure, the above method is characterized in that: the first bit block is used for indicating whether the first radio signal is correctly received; when the first signaling corresponds to the first type, the first signaling is used for indicating a MCS employed by the first radio signal from a first MCS set; when the first signaling corresponds to the second type, the first signaling is used for indicating an MCS employed by the first radio signal from a second MCS set; and a target BLER of the first MCS set is less than a target BLER of the second MCS set.

According to one aspect of the disclosure, the above method is characterized in that: the K1 is predefined, or the K1 is configurable, or a number of bits included in the first bit block is used for determining the K1.

According to one aspect of the disclosure, the above method includes:

transmitting K0 piece(s) of information.

Herein, the K0 piece(s) of information is(are) used for determining the K time-frequency resource groups, and the K0 is a positive integer not greater than the K; the K0 is equal to the K and the K0 pieces of information are used for determining the K time-frequency resource groups respectively, or, the K0 is equal to 1 and a second bit block is used for generating any one of the K radio signals.

The disclosure provides a UE for wireless communication, wherein the UE includes:

a first receiver, to receive a first signaling, the first signaling being used for determining a first time-frequency resource group, and the first time-frequency resource group being reserved to transmission of a first bit block; and a first transmitter, to transmit K radio signals and the first bit block in K time-frequency resource groups.

Herein, time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

The disclosure provides a base station for wireless communication, wherein the base station includes:

a second transmitter, to transmit a first signaling, the first signaling being used for determining a first time-frequency resource group, and the first time-frequency resource group being reserved to transmission of a first bit block; and a second receiver, to receive K radio signals and the first bit block in K time-frequency resource groups.

Herein, time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

In one embodiment, compared with conventional schemes, the disclosure has the following benefits.

In view of the requirements of higher reliability in NR Release 16, when a PUCCH is not orthogonal to a PUSCH in time domain, the disclosure enhances the transmission of a UCI.

In current standards, when a PUCCH reserved to transmit a UCI is not orthogonal to one PUSCH in time domain, the transmission of the UCI is changed onto the PUSCH. In NR Release 16, one PUSCH probably occupies few time-domain resources, for example, one or several multicarrier symbols, there might be multiple PUSCHs transmitted in one same timeslot of one same carrier or in one same subframe, and the multiple PUSCHs may be multiple repeated transmissions of one Transport Block (TB) or may be transmissions of multiple different TBs; when a UCI is not orthogonal to at least one of the multiple PUSCHs, the disclosure determines on which of the PUSCHs the UCI is to be transmitted according to the service type corresponding to the UCI, which is beneficial to both the transmission low latency of the URLLC UCI and the transmission low latency of the URLLC PUSCH.

In the disclosure, when one URLLC UCI is not orthogonal to at least one of multiple PUSCHs, the URLLC UCI is transmitted on one or more relatively early PUSCH(s), which guarantees the transmission low latency of the URLLC UCI.

In the disclosure, when one eMBB UCI is not orthogonal to at least one of multiple URLLC PUSCHs, the eMBB UCI is transmitted on one or more relatively late PUSCH(s), which is beneficial to the transmission low latency of the URLLC PUSCH.

BRIEF DESCRIPTION OF THE DRAWINGS

Other features, purposes and advantages of the disclosure will become more apparent from the detailed description of non-restrictive embodiments taken in conjunction with the following drawings.

FIG. 8 is a diagram illustrating an MCS employed by a first radio signal according to one embodiment of the disclosure.

FIG. 9 is a diagram illustrating the determination of K1 according to one embodiment of the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
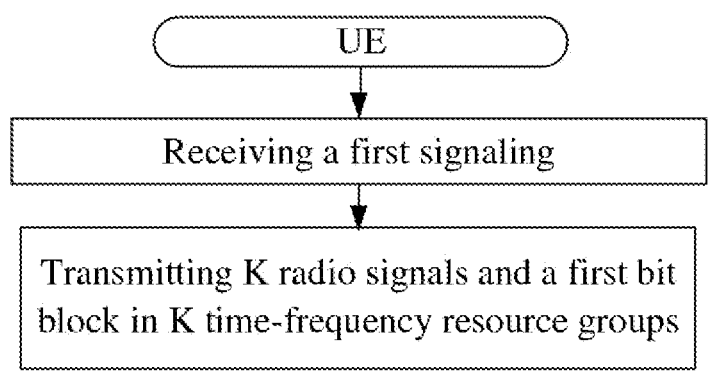
FIG. 1 is a flowchart of a first signaling, K radio signals and a first bit block according to one embodiment of the disclosure.

Embodiment 1 illustrates an example of a flowchart of a first signaling, K radio signals and a first bit block, as shown in FIG. 1.

In Embodiment 1, the UE in the disclosure receives a first signaling, the first signaling being used for determining a first time-frequency resource group and the first time-frequency resource group being reserved to transmission of a first bit block, and the UE transmits K radio signals and the first bit block in K time-frequency resource groups; time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

In one embodiment, the first signaling is configured dynamically.

In one embodiment, the first signaling is a physical layer signaling.

In one embodiment, the first signaling is a Downlink Control Information (DCI) signaling.

In one embodiment, the first signaling is a DCI signaling for downlink grant.

In one embodiment, the first signaling is a DCI signaling for uplink grant.

In one embodiment, the first signaling is transmitted on a downlink physical layer control channel (that is, a downlink channel capable of carrying physical layer signalings only).

In one subembodiment, the downlink physical layer control channel is a Physical Downlink Control Channel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first signaling is transmitted on a downlink physical layer data channel (that is, a downlink channel capable of carrying physical layer data).

In one subembodiment, the downlink physical layer data channel is a Physical Downlink Shared Channel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the first signaling is a DCI signaling of Format 1_0 or a DCI signaling of Format 1_1, and specific definitions of the Format 1_0 and Format 1_1 can refer to Chapter 7.3.1.2 in 3GPP TS38.212.

In one embodiment, the first signaling is a DCI signaling of Format 1_0, and specific definitions of the Format 1_0 can refer to Chapter 7.3.1.2 in 3GPP TS38.212.

In one embodiment, the first signaling is a DCI signaling of Format 1_1, and specific definitions of the Format 1_1 can refer to Chapter 7.3.1.2 in 3GPP TS38.212.

In one embodiment, the first signaling is a DCI signaling of Format 0_0 or a DCI signaling of Format 0_1, and specific definitions of the Format 0_0 and Format 0_1 can refer to Chapter 7.3.1.1 in 3GPP TS38.212.

In one embodiment, the first signaling is a DCI signaling of Format 0_0, and specific definitions of the Format 0_0 can refer to Chapter 7.3.1.1 in 3GPP TS38.212.

In one embodiment, the first signaling is a DCI signaling of Format 0_1, and specific definitions of the Format 0_1 can refer to Chapter 7.3.1.1 in 3GPP TS38.212.

In one embodiment, the first time-frequency resource group is reserved to transmission of a UCI.

In one embodiment, the first time-frequency resource group includes time-frequency resources belonging to an uplink physical layer control channel (that is, an uplink channel capable of carrying physical layer signalings only).

In one subembodiment, the uplink physical layer control channel is a Physical Uplink Control Channel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, the first time-frequency resource group includes a positive integer number of Resource Elements (REs).

In one embodiment, the first time-frequency resource group includes a positive integer number of multicarrier symbols in time domain, and the first time-frequency resource group includes a positive integer number of subcarriers in frequency domain.

In one embodiment, the first time-frequency resource group includes a positive integer number of multicarrier symbols in time domain, and the first time-frequency resource group includes a positive integer number of Resource Blocks (RBs) in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol includes a Cyclic Prefix (CP).

In one embodiment, the first signaling includes a first field, and the first field included in the first signaling is used for determining the first time-frequency resource group.

In one subembodiment, the first field included in the first signaling includes a positive integer number of bits.

In one subembodiment, the first field included in the first signaling indicates explicitly the first time-frequency resource group.

In one subembodiment, the first field included in the first signaling indicates implicitly the first time-frequency resource group.

In one subembodiment, the first field included in the first signaling is used for determining the first time-frequency resource group from a first time-frequency resource group set, and the first time-frequency resource group set includes a positive integer number of time-frequency resource groups.

In one subembodiment, the first field included in the first signaling is used for indicating an index of the first time-frequency resource group in a first time-frequency resource group set, and the first time-frequency resource group set includes a positive integer number of time-frequency resources.

In one subembodiment, the first field included in the first signaling is a PUCCH resource indicator, and specific definitions of the PUCCH resource indicator can refer to Chapter 9.2.3 in 3GPP TS38.213.

In one subembodiment, the first field included in the first signaling is used for indicating a feedback of a first Channel State Information (CSI), and the first CSI feedback is carried in the first bit block; the first time-frequency resource group includes time-frequency resources used for feeding back the first CSI, a correspondence between the first time-frequency resource group and the first CSI is configured through a higher-layer signaling.

In one subembodiment, the first field included in the first signaling is used for determining a first CSI from a first CSI set, the first CSI set includes a positive integer number of CSIs, the first CSI is one CSI in the first CSI set, the first bit block carries the first CSI feedback; the first time-frequency resource group includes time-frequency resources used for feeding back the first CSI, a correspondence between the first time-frequency resource group and the first CSI is configured through a higher-layer signaling.

In one subembodiment, the first field included in the first signaling indicates an index of a first CSI in a first CSI set, the first CSI set includes a positive integer number of CSIs, the first CSI is one CSI in the first CSI set, the first bit block carries the first CSI feedback; the first time-frequency resource group includes time-frequency resources used for feeding back the first CSI, a correspondence between the first time-frequency resource group and the first CSI is configured through a higher-layer signaling.

In one subembodiment, the first field included in the first signaling is a CSI request field, and specific definitions of the CSI request field can refer to Chapter 7.3.1.1 in 3GPP TS38.212.

In one embodiment, the first bit block includes a positive integer number of bits.

In one embodiment, the first bit block carries at least one of a Hybrid Automatic Repeat reQuest ACKnowledgement (HARQ-ACK) feedback and a CSI.

In one embodiment, the first bit block carries a HARQ-ACK feedback.

In one embodiment, the first bit block carries a CSI.

In one embodiment, the first bit block carries a HARQ-ACK feedback and a CSI.

In one embodiment, the K time-frequency resource groups are used for transmission of uplink data.

In one embodiment, the K time-frequency resource groups all include time-frequency resources belonging to an Uplink Shared Channel (UL-SCH).

In one embodiment, the K time-frequency resource groups all include time-frequency resources belonging to an uplink physical layer data channel (that is, an uplink channel capable of carrying physical layer data).

In one subembodiment, the uplink physical layer data channel is a Physical Uplink Shared Channel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUS CH (NB-PUSCH).

In one embodiment, one of the K time-frequency resource groups includes a positive integer number of REs.

In one embodiment, one of the K time-frequency resource groups includes a positive integer number of multicarrier symbols in time domain and a positive integer number of subcarriers in frequency domain.

In one embodiment, one of the K time-frequency resource groups includes a positive integer number of multicarrier symbols in time domain and a positive integer number of RBs in frequency domain.

In one embodiment, one of the K time-frequency resource groups includes multiple consecutive multicarrier symbols in time domain.

In one embodiment, at least two of the multiple multicarrier symbols included in one of the K time-frequency resource groups in time domain are consecutive.

In one embodiment, two of the multiple multicarrier symbols included in one of the K time-frequency resource groups in time domain are consecutive.

In one embodiment, two of the multiple multicarrier symbols included in one of the K time-frequency resource groups in time domain are not consecutive.

In one embodiment, at least two of the multiple multicarrier symbols included in one of the K time-frequency resource groups in time domain are not consecutive.

In one embodiment, any two of the K time-frequency resource groups include same subcarriers in frequency domain.

In one embodiment, any two of the K time-frequency resource groups include at least one subcarrier in frequency domain.

In one embodiment, any two of the K time-frequency resource groups do not include any same subcarrier in frequency domain.

In one embodiment, any two of the K time-frequency resource groups include at least one different subcarrier in frequency domain.

In one embodiment, two of the K time-frequency resource groups include same subcarriers in frequency domain.

In one embodiment, two of the K time-frequency resource groups include at least one same subcarrier in frequency domain.

In one embodiment, two of the K time-frequency resource groups do not include any same subcarrier in frequency domain.

In one embodiment, two of the K time-frequency resource groups include at least at least one different subcarrier in frequency domain.

In one embodiment, at least two of the K time-frequency resource groups include same subcarriers in frequency domain.

In one embodiment, at least two of the K time-frequency resource groups include at least one same subcarrier in frequency domain.

In one embodiment, at least two of the K time-frequency resource groups do not include any same subcarrier in frequency domain.

In one embodiment, at least two of the K time-frequency resource groups include at least one different subcarrier in frequency domain.

In one embodiment, any two of the K time-frequency resource groups include a same number of REs.

In one embodiment, any two of the K time-frequency resource groups include different numbers of REs.

In one embodiment, two of the K time-frequency resource groups include a same number or different numbers of REs.

In one embodiment, two of the K time-frequency resource groups include a same number of REs.

In one embodiment, two of the K time-frequency resource groups include different numbers of REs.

In one embodiment, at least two of the K time-frequency resource groups include a same number of REs.

In one embodiment, at least two of the K time-frequency resource groups include different numbers of REs.

In one embodiment, time-domain resources occupied by the first time-frequency resource group and time-domain resources occupied by at least one of the K time-frequency resource groups include at least one same multicarrier symbol.

In one embodiment, time-domain resources occupied by the first time-frequency resource group and time-domain resources occupied by at least two of the K time-frequency resource groups include at least one same multicarrier symbol.

In one embodiment, time-domain resources occupied by the first time-frequency resource group and time-domain resources occupied by only one of the K time-frequency resource groups include at least one same multicarrier symbol.

In one embodiment, time-domain resources occupied by the first time-frequency resource group and time-domain resources occupied by multiple of the K time-frequency resource groups include at least one same multicarrier symbol.

In one embodiment, time-domain resources occupied by the first time-frequency resource group and time-domain resources occupied by each of the K time-frequency resource groups include at least one same multicarrier symbol.

In one embodiment, J time-frequency resource group(s) is(are) all time-frequency resource groups overlapping with the first time-frequency resource group in time domain among the K time-frequency resource groups, wherein the J is a positive integer not greater than the K.

In one subembodiment, the J is equal to the K.

In one subembodiment, the J is less than the K.

In one subembodiment, the first time-frequency resource group and any one of the J time-frequency resource group(s) are partially or totally overlapping in time domain.

In one subembodiment, the first time-frequency resource group and any one of the J time-frequency resource group(s) include at least one same multicarrier symbol in time domain.

In one subembodiment, the first time-frequency resource group and each of the J time-frequency resource group(s) are partially overlapping in time domain.

In one subembodiment, the first time-frequency resource group and each of the J time-frequency resource group(s) include at least one same multicarrier symbol and at least one different multicarrier symbol in time domain.

In one subembodiment, the first time-frequency resource group and at least one of the J time-frequency resource group(s) are partially overlapping in time domain.

In one subembodiment, the first time-frequency resource group and at least one of the J time-frequency resource group(s) include at least one same multicarrier symbol and at least one different multicarrier symbol in time domain.

In one subembodiment, the first time-frequency resource group and each of the J time-frequency resource group(s) are totally overlapping in time domain.

In one subembodiment, the first time-frequency resource group and each of the J time-frequency resource group(s) include totally same multicarrier symbols in time domain.

In one subembodiment, the first time-frequency resource group and at least one of the J time-frequency resource group(s) are totally overlapping in time domain.

In one subembodiment, the first time-frequency resource group and at least one of the J time-frequency resource group(s) include totally same multicarrier symbols in time domain.

In one embodiment, time-domain resources occupied by the first time-frequency resource group and time-domain resources occupied by the K time-frequency resource groups both belong to a first time window.

In one subembodiment, the first time window includes one slot.

In one subembodiment, the first time window includes one subframe.

In one subembodiment, the first time window includes multiple slots.

In one subembodiment, the first time window includes multiple consecutive slots.

In one subembodiment, the first time window includes multiple consecutive uplink slots.

In one subembodiment, the first time window includes multiple subframes.

In one subembodiment, the first time window includes multiple consecutive subframes.

In one subembodiment, the first time window includes multiple consecutive uplink subframes.

In one subembodiment, the first time window includes a positive integer number of multicarrier symbols.

In one subembodiment, the first time window includes a positive integer number of consecutive multicarrier symbols.

In one embodiment, the K radio signals all include data.

In one embodiment, the K radio signals all include data and a DeModulation Reference Signal (DMRS).

In one embodiment, the K radio signals all include uplink data.

In one embodiment, a transport channel of the K radio signals is an Uplink Shared Channel (UL-SCH).

In one embodiment, the K radio signals are transmitted on an uplink physical layer data channel (that is, an uplink channel capable of carrying physical layer data).

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, K Transport Blocks (TB) are used for generating K radio signals respectively.

In one embodiment, one TB is used for generating each of the K radio signals.

In one embodiment, a given TB is used for generating a given radio signal.

In one subembodiment, the given radio signal includes an initial transmission or a retransmission of the given TB.

In one subembodiment, the given radio signal includes an initial transmission of the given TB.

In one subembodiment, the given radio signal includes a retransmission of the given TB.

In one subembodiment, the given TB is processed in sequence through CRC insertion, channel coding, rate matching, scrambling, modulation, layer mapping, precoding, mapping to resource element, OFDM baseband signal generation, and modulation and upconversion to obtain the given radio signal.

In one subembodiment, the given TB is processed in sequence through CRC insertion, channel coding, rate matching, scrambling, modulation, layer mapping, precoding, mapping to virtual resource blocks, mapping from virtual to physical resource blocks, OFDM baseband signal generation, and modulation and upconversion to obtain the given radio signal.

In one subembodiment, the given TB is processed in sequence through CRC insertion, segmentation, coding block-level CRC insertion, channel coding, rate matching, concatenation, scrambling, modulation, layer mapping, precoding, mapping to resource element, OFDM baseband signal generation, and modulation and upconversion to obtain the given radio signal.

In one subembodiment, the given TB is processed in sequence through CRC insertion, segmentation, coding block-level CRC insertion, channel coding, rate matching, concatenation, scrambling, modulation, layer mapping, precoding, mapping to virtual resource blocks, mapping from virtual to physical resource blocks, OFDM baseband signal generation, and modulation and upconversion to obtain the given radio signal.

In one subembodiment, the given TB is processed in sequence through CRC insertion, channel coding, rate matching, scrambling, modulation, layer mapping, transform precoding, precoding, mapping to resource element, OFDM baseband signal generation, and modulation and upconversion to obtain the given radio signal.

In one subembodiment, the given TB is processed in sequence through CRC insertion, channel coding, rate matching, scrambling, modulation, layer mapping, transform precoding, precoding, mapping to virtual resource blocks, mapping from virtual to physical resource blocks, OFDM baseband signal generation, and modulation and upconversion to obtain the given radio signal.

In one subembodiment, the given TB is processed in sequence through CRC insertion, segmentation, coding block-level CRC insertion, channel coding, rate matching, concatenation, scrambling, modulation, layer mapping, transform precoding, precoding, mapping to resource element, OFDM baseband signal generation, and modulation and upconversion to obtain the given radio signal.

In one subembodiment, the given TB is processed in sequence through CRC insertion, segmentation, coding block-level CRC insertion, channel coding, rate matching, concatenation, scrambling, modulation, layer mapping, transform precoding, precoding, mapping to virtual resource blocks, mapping from virtual to physical resource blocks, OFDM baseband signal generation, and modulation and upconversion to obtain the given radio signal.

In one embodiment, the K radio signals are K repeated transmissions of one TB.

In one subembodiment, two of the K radio signals correspond to one same or different Redundancy Versions (RVs).

In one subembodiment, two of the K radio signals correspond to one same RV.

In one subembodiment, two of the K radio signals correspond to different RVs.

In one subembodiment, any two of the K radio signals correspond to one same RV.

In one subembodiment, any two of the K radio signals correspond to different RVs.

In one embodiment, the phrase that the first signaling corresponds to a first type or a second type refers that: a signaling format of the first signaling is the first type or the second type.

In one subembodiment, the first type and the second type are two different signaling formats.

In one subembodiment, both the first type and the second type are signaling formats for scheduling of downlink physical layer data channel.

In one subembodiment, both the first type and the second type are signaling formats for scheduling of PDSCH.

In one subembodiment, both the first type and the second type are signaling formats for scheduling of uplink physical layer data channel.

In one subembodiment, both the first type and the second type are signaling formats for scheduling of PUSCH.

In one subembodiment, the first type and the second type are a signaling format for scheduling of PDSCH and a signaling format for scheduling of PUSCH respectively.

In one subembodiment, the first type and the second type are a signaling format for scheduling of downlink physical layer data channel and a signaling format for scheduling of uplink physical layer data channel respectively.

In one subembodiment, the second type is DCI format 1_0 or DCI format 1_1, and specific definitions of the DCI format 1_0 and DCI format 1_1 can refer to Chapter 7.3.1.2 in 3GPP TS38.212.

In one subembodiment, the second type is DCI format 1_0, and specific definitions of the DCI format 1_0 can refer to Chapter 7.3.1.2 in 3GPP TS38.212.

In one subembodiment, the second type is DCI format 1_1, and specific definitions of the DCI format 1_1 can refer to Chapter 7.3.1.2 in 3GPP TS38.212.

In one subembodiment, the second type is DCI format 0_0 or DCI format 0_1, and specific definitions of the DCI format 0_0 and DCI format 0_1 can refer to Chapter 7.3.1.1 in 3GPP TS38.212.

In one subembodiment, the second type is DCI format 0_0, and specific definitions of the DCI format 0_0 can refer to Chapter 7.3.1.1 in 3GPP TS38.212.

In one subembodiment, the second type is DCI format 0_1, and specific definitions of the DCI format 0_1 can refer to Chapter 7.3.1.1 in 3GPP TS38.212.

In one subembodiment, the first type is different from all of the DCI format 1_0, DCI format 1_1, format 0_0 and DCI format 0_1; specific definitions of the DCI format 0_0 and DCI format 0_1 can refer to Chapter 7.3.1.1 in 3GPP TS38.212; and specific definitions of the DCI format 1_0 and DCI format 1_1 can refer to Chapter 7.3.1.2 in 3GPP TS38.212.

In one subembodiment, the first type is different from all of the DCI format 1_0, DCI format 1_1, DCI format 0_0, DCI format 0_1, DCI format 2_0, DCI format 2_1, DCI format 2_2 and DCI format 2_3; specific definitions of the DCI format 0_0 and DCI format 0_1 can refer to Chapter 7.3.1.1 in 3GPP TS38.212; and specific definitions of the DCI format 1_0 and DCI format 1_1 can refer to Chapter 7.3.1.2 in 3GPP TS38.212; and specific definitions of the DCI format 2_0, DCI format 2_1, DCI format 2_2 and DCI format 2_3 can refer to Chapter 7.3.1.3 in 3GPP TS38.212.

In one embodiment, the phrase that the first signaling corresponds to a first type or a second type refers that: the first signaling carries the first type or the second type.

In one subembodiment, the first type and the second type are two different signaling identifiers.

In one subembodiment, the first type and the second type are two different non-negative integers.

In one subembodiment, the first type and the second type are two different Radio Network Temporary Identifiers (RNTIs).

In one subembodiment, the second type includes a Cell-RNTI (C-RNTI) or a Configured Scheduling-RNTI (CS-RNTI), the first type includes a new-RNTI, and specific definitions of the new RNTI can refer to Chapter 5.1.3.1 in 3GPP TS38.214.

In one subembodiment, the first type and the second type are two different RNTIs among multiple RNTIs, the multiple RNTIs include at least one of C-RNTI, CS-RNTI and new-RNTI; and specific definitions of the new RNTI can refer to Chapter 5.1.3.1 in 3GPP TS38.214.

In one subembodiment, the first type and the second type are two different RNTIs among multiple RNTIs, the multiple RNTIs include at least two of C-RNTI, CS-RNTI and new-RNTI; and specific definitions of the new RNTI can refer to Chapter 5.1.3.1 in 3GPP TS38.214.

In one subembodiment, the first type and the second type are two different RNTIs among multiple RNTIs, the multiple RNTIs include new-RNTI and at least one of C-RNTI and CS-RNTI; and specific definitions of the new RNTI can refer to Chapter 5.1.3.1 in 3GPP TS38.214.

In one subembodiment, the first type or the second type is a signaling identifier of the first signaling.

In one subembodiment, the first signaling is a DCI signaling identified by the first type or the second type.

In one subembodiment, the first type or the second type is used for generating a Reference Signal (RS) sequence of a DMRS of the first signaling.

In one subembodiment, a Cyclic Redundancy Check (CRC) bit sequence of the first signaling is scrambled with the first type or the second type.

In one embodiment, the above method further includes: receiving first information.

Herein, the first information is used for indicating the first type and the second type.

In one subembodiment, the first information is configured semi-statically.

In one subembodiment, the first information is carried by a higher-layer signaling.

In one subembodiment, the first information is carried by a Radio Resource Control (RRC) signaling.

In one subembodiment, the first information includes one or more Information Elements (IEs) in one RRC signaling.

In one subembodiment, the first information includes partial or the entirety of one IE in one RRC signaling.

In one subembodiment, the first information includes more IEs in one RRC signaling.

In one subembodiment, the first information indicates explicitly the first identifier and the second identifier.

In one subembodiment, the first information indicates implicitly the first identifier and the second identifier.

In one embodiment, whether the first signaling carries the first type or the second type and the number of bits included in the first bit block are used together for determining the K1 time-frequency resource group(s) from the K time-frequency resource groups.

In one embodiment, the K1 is greater than 1, the first bit block includes K1 bit subblocks, and the K1 bit subblocks are transmitted in the K1 time-frequency resource groups respectively.

In one embodiment, each of the K1 time-frequency resource group(s) transmits the first bit block.

In one embodiment, when the first signaling corresponds to the first type, the K1 time-frequency resource group(s) is(are) K1 earliest time-frequency resource group(s) in time domain among K2 time-frequency resource group(s) respectively; each of the K2 time-frequency resource group(s) is one of the K time-frequency resource groups, and the K2 is a positive integer not less than the K1 but not greater than the K.

In one subembodiment, the K2 is equal to the K, and the K2 time-frequency resource groups are the K time-frequency resource groups respectively.

In one subembodiment, the K2 time-frequency resource group(s) is(are) all time-frequency resource groups overlapping with the first time-frequency resource group in time domain among the K time-frequency resource groups.

In one embodiment, when the first signaling corresponds to the second type, the K1 time-frequency resource group(s) is(are) K1 latest time-frequency resource group(s) in time domain among K3 time-frequency resource group(s) respectively; each of the K3 time-frequency resource group(s) is one of the K time-frequency resource groups, and the K3 is a positive integer not less than the K1 but not greater than the K.

In one subembodiment, the K3 is equal to the K, and the K3 time-frequency resource groups are the K time-frequency resource groups respectively.

In one subembodiment, the K3 time-frequency resource group(s) is(are) all time-frequency resource groups overlapping with the first time-frequency resource group in time domain among the K time-frequency resource groups.

In one embodiment, when the first signaling corresponds to the first type, the K1 time-frequency resource group(s) is(are) K1 earliest time-frequency resource group(s) in time domain among K2 time-frequency resource group(s) respectively; each of the K2 time-frequency resource group(s) is one of the K time-frequency resource groups, and the K2 is a positive integer not less than the K1 but not greater than the K; when the first signaling corresponds to the second type, the K1 time-frequency resource group(s) is(are) K1 latest time-frequency resource group(s) in time domain among K3 time-frequency resource group(s) respectively; each of the K3 time-frequency resource group(s) is one of the K time-frequency resource groups, and the K3 is a positive integer not less than the K1 but not greater than the K.

In one subembodiment, the K2 is equal to the K, and the K2 time-frequency resource groups are the K time-frequency resource groups respectively.

In one subembodiment, the K2 time-frequency resource group(s) is(are) all time-frequency resource groups overlapping with the first time-frequency resource group in time domain among the K time-frequency resource groups.

In one subembodiment, the K3 is equal to the K, and the K3 time-frequency resource groups are the K time-frequency resource groups respectively;

In one subembodiment, the K3 time-frequency resource group(s) is(are) all time-frequency resource groups overlapping with the first time-frequency resource group in time domain among the K time-frequency resource groups In one embodiment, the K1 is predefined, or the K1 is configurable, or a number of bits included in the first bit block is used for determining the K1.

In one embodiment, the K1 is predefined.

In one embodiment, the K1 is configurable.

In one embodiment, a number of bits included in the first bit block is used for determining the K1.

Embodiment 2

Figure 2:
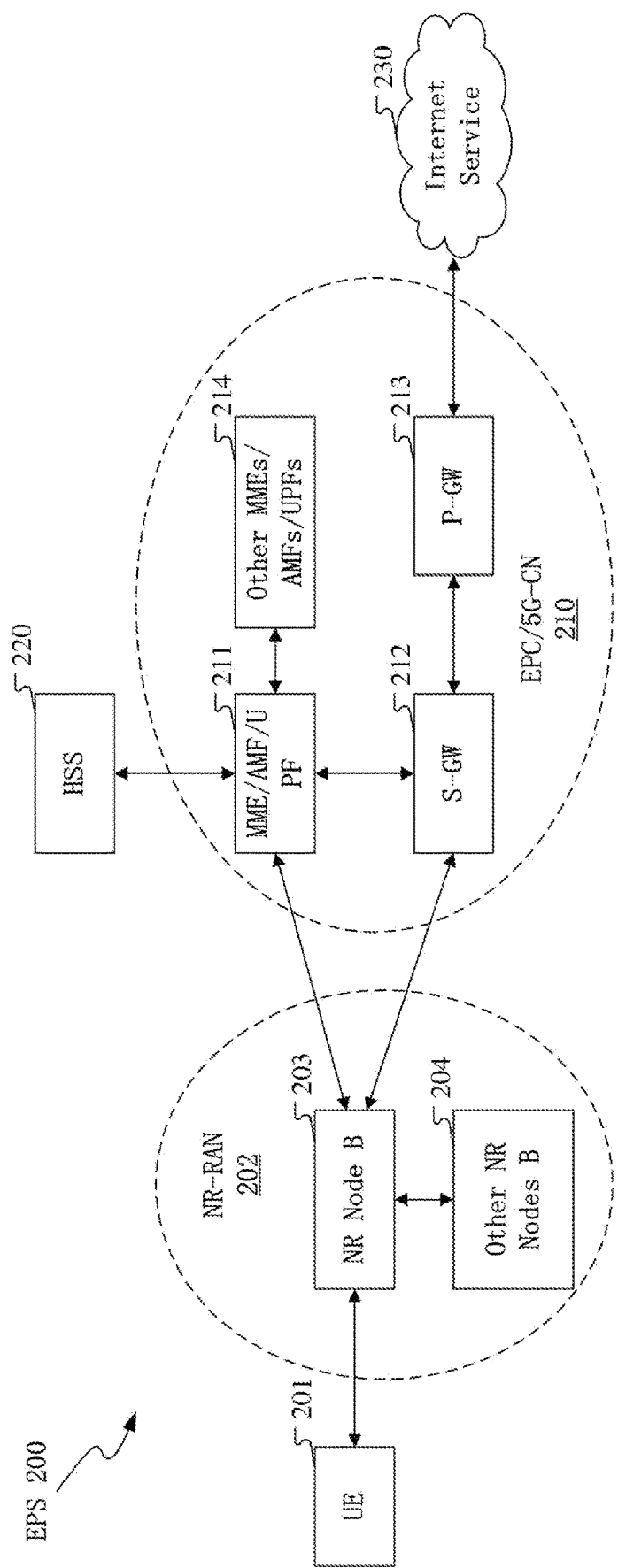
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the gNB 203 corresponds to the base station in the disclosure.

In one subembodiment, the UE 201 supports wireless communication.

In one subembodiment, the gNB 203 supports wireless communication.

In one subembodiment, the UE 201 supports MIMO wireless communication.

In one subembodiment, the gNB 203 supports MIMO wireless communication.

Embodiment 3

Figure 3:
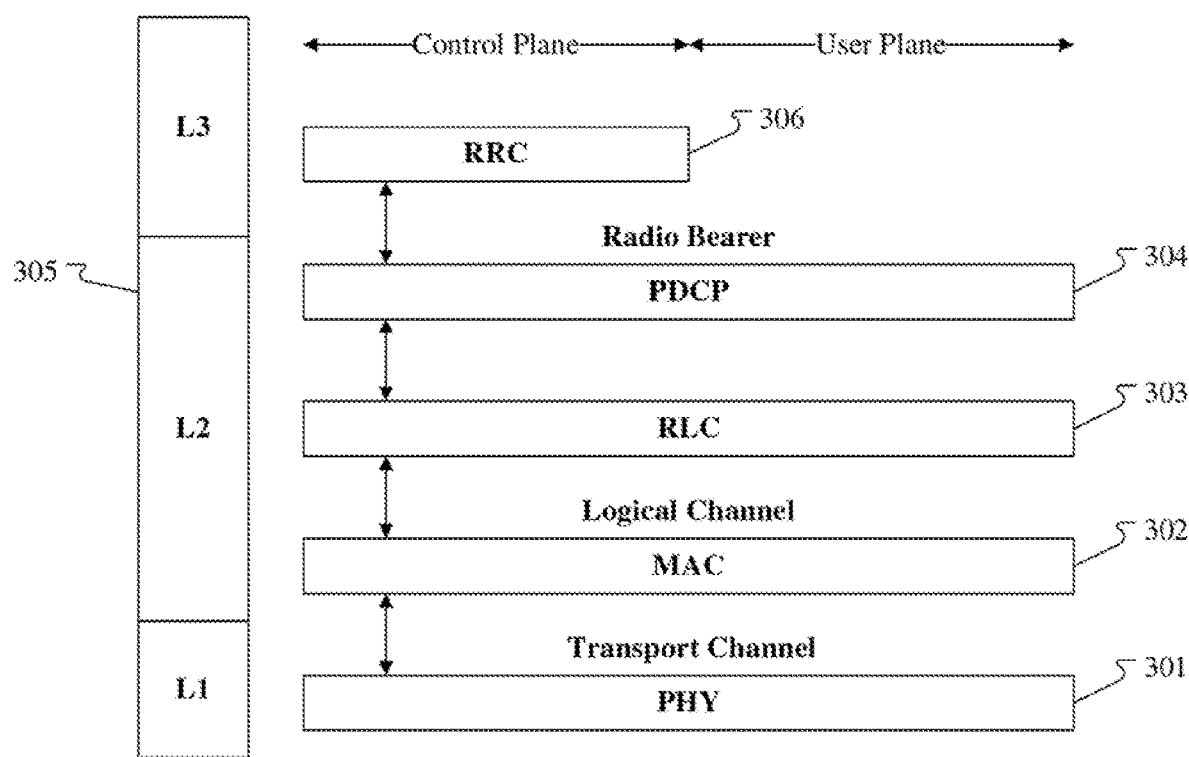
FIG. 3 is a diagram illustrating an embodiment of a radio protocol architecture of a user plane and a control plane according to one embodiment of the disclosure.

FIG. 3 illustrates a diagram of an embodiment of a radio protocol architecture of a user plane and a control plane, as shown in FIG. 3.

FIG. 3 is a diagram of an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the first signaling in the disclosure is generated on the PHY 301.

In one embodiment, the first radio signal in the disclosure is generated on the PHY 301.

In one embodiment, the K radio signals in the disclosure are generated on the PHY 301.

In one embodiment, a radio signal transmitting the first bit block in the disclosure is generated on the PHY 301.

In one embodiment, one of the K0 piece(s) of information in the disclosure is generated on the PHY 301.

In one embodiment, one of the K0 piece(s) of information in the disclosure is generated on the RRC sublayer 306.

In one embodiment, one of the K0 piece(s) of information in the disclosure is generated on the MAC sublayer 302.

In one embodiment, the first bit block in the disclosure is generated on the PHY 301.

In one embodiment, the first bit block in the disclosure is generated on the MAC sublayer 302.

Embodiment 4

Figure 4:
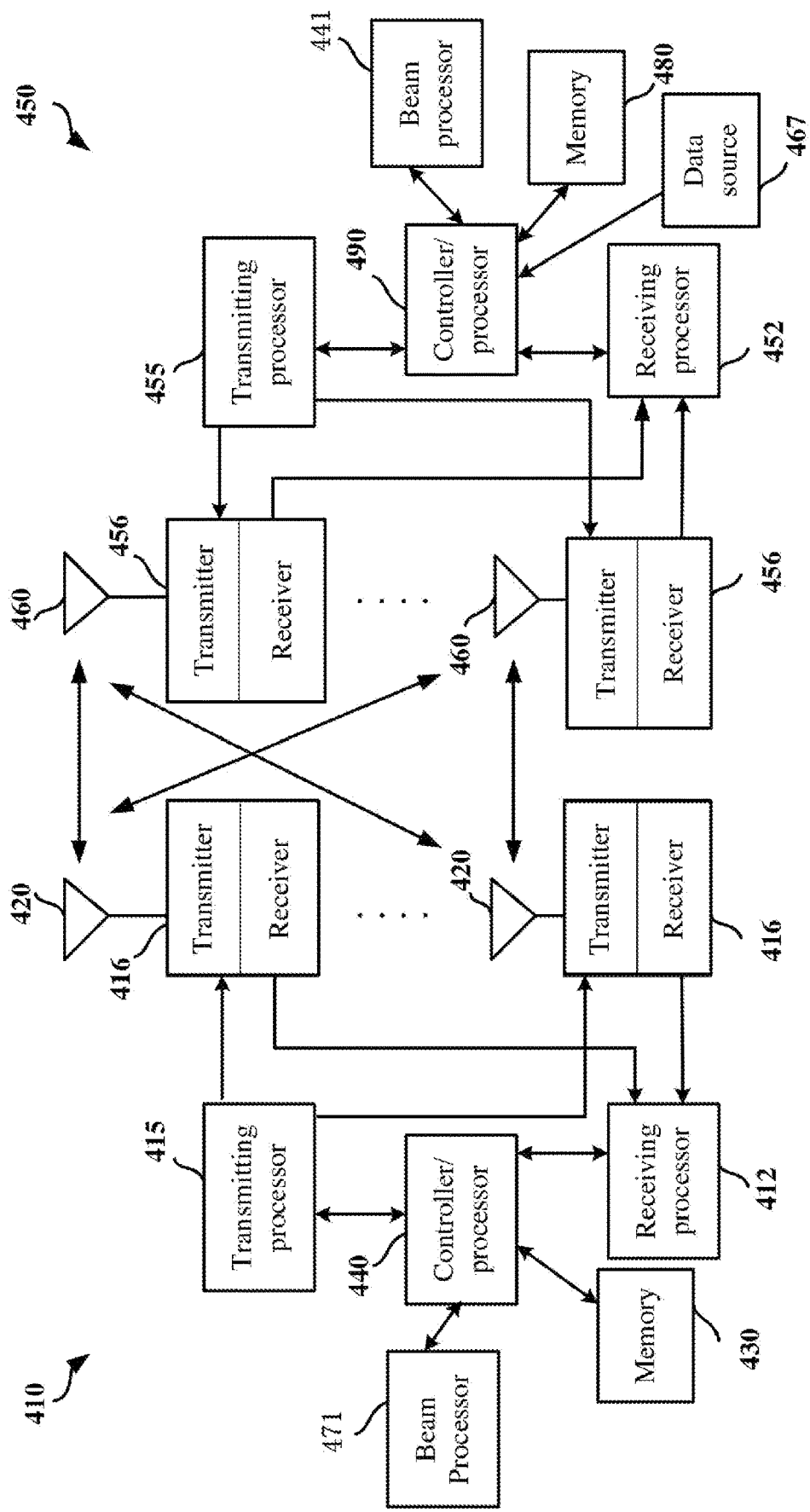
FIG. 4 is a diagram illustrating an NR node and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a beam processor 471, a transmitting processor 415, a transmitter/receiver 416 and an antenna 420.

The UE 450 includes a controller/processor 490, a memory 480, a data source 467, a beam processor 441, a transmitting processor 455, a receiving processor 452, a transmitter/receiver 456 and an antenna 460.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit used for transmission requirements. The scheduling unit is configured to schedule air-interface resources corresponding to transmission requirements.

The beam processor 471 determines a first signaling.

The transmitting processor 415 receives a bit stream output from the controller/processor 440, and performs various signal transmitting processing functions used for L1 layer (that is, PHY), including encoding, interleaving, scrambling, modulation, power control/allocation, generation of physical layer control signalings (including PBCH, PDCCH, PHICH, PCFICH, reference signal), etc.

The transmitting processor 415 receives a bit stream output from the controller/processor 440, and performs various signal transmitting processing functions used for L1 layer (that is, PHY), including multi-antenna transmission, spreading, code division multiplexing, precoding, etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs various signal receiving processing functions used for L1 layer (that is, PHY), including decoding, de-interleaving, descrambling, demodulation, extraction of physical layer control signalings, etc.

The receiving processor 452 performs various signal receiving processing functions used for L1 layer (that is, PHY), including multi-antenna receiving, despreading, code division multiplexing, precoding, etc.

The beam processor 441 determines a first signaling.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to a memory 480 that stores program codes and data. The memory 480 may be a computer readable medium.

In UL transmission, processes relevant to the base station device 410 include the following.

The receiver 416 receives a radio-frequency signal via the corresponding antenna 420, converts the received radio-frequency signal into a baseband signal and provides the baseband signal to the receiving processor 412.

The receiving processor 412 performs various signal receiving processing functions used for L1 layer (that is, PHY), including decoding, de-interleaving, descrambling, demodulation, extraction of physical layer control signalings, etc.

The receiving processor 412 performs various signal receiving processing functions used for L1 layer (that is, PHY), including multi-antenna receiving, despreading, code division multiplexing, precoding, etc.

The controller/processor 440 performs functions of L2 layer, and is connected to the memory 430 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 may be provided to a core network.

The beam processor 471 determines to receive K radio signals and a first bit block in K time-frequency resource groups.

In UL transmission, processes relevant to the UE 450 include the following.

The data source 467 provides a higher-layer packet to the controller/processor 490. The data source 467 illustrates all protocol layers above L2 layer.

The transmitter 456 transmits a radio-frequency signal through the corresponding antenna 460, converts a baseband signal into a radio-frequency signal and provides the radio-frequency signal to the corresponding antenna 460.

The transmitting processor 455 performs various signal transmitting processing functions of L1 layer (that is, PHY), including encoding, interleaving, scrambling, modulation, generation of physical layer signalings, etc.

The transmitting processor 455 performs various signal transmitting processing functions of L1 layer (that is, PHY), including multi-antenna transmitting, spreading, code division multiplexing, precoding, etc.

The controller/processor 490 performs header compression, encryption, packet segmentation and reordering, and multiplexing between a logical channel and a transport channel based on the radio resource allocation of the gNB 410, and performs functions of L2 layer used for the user plane and the control plane.

The controller/processor 490 is also in charge of HARQ operation, retransmission of lost packets, and signalings to the eNB 410.

The beam processor 471 determines to transmit K radio signals and a first bit block in K time-frequency resource groups.

In one embodiment, the UE 450 includes at least one processor and at least one memory. The at least one memory includes computer program codes. The at least one memory and the computer program codes are configured to be used in collaboration with the at least one processor. The UE 450 at least receives a first signaling, the first signaling being used for determining a first time-frequency resource group and the first time-frequency resource group being reserved to transmission of a first bit block, and transmits K radio signals and the first bit block in K time-frequency resource groups; time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

In one embodiment, the UE 450 includes a memory that stores a computer readable instruction program. The computer readable instruction program generates an action when executed by at least one processor. The action includes: receiving a first signaling, the first signaling being used for determining a first time-frequency resource group and the first time-frequency resource group being reserved to transmission of a first bit block, and transmitting K radio signals and the first bit block in K time-frequency resource groups; time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

In one embodiment, the gNB 410 includes at least one processor and at least one memory. The at least one memory includes computer program codes. The at least one memory and the computer program codes are configured to be used in collaboration with the at least one processor. The gNB 410 at least transmits a first signaling, the first signaling being used for determining a first time-frequency resource group and the first time-frequency resource group being reserved to transmission of a first bit block, and receives K radio signals and the first bit block in K time-frequency resource groups; time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

In one embodiment, the gNB 410 includes a memory that stores a computer readable instruction program. The computer readable instruction program generates an action when executed by at least one processor. The action includes: transmitting a first signaling, the first signaling being used for determining a first time-frequency resource group and the first time-frequency resource group being reserved to transmission of a first bit block, and receiving K radio signals and the first bit block in K time-frequency resource groups; time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

In one embodiment, the UE 450 corresponds to the UE in the disclosure.

In one embodiment, the gNB 410 corresponds to the base station in the disclosure.

In one embodiment, at least the former two of the receiver 456, the receiving processor 452 and the controller/processor 490 are used for receiving the first signaling in the disclosure.

In one embodiment, at least the former two of the transmitter 416, the transmitting processor 415 and the controller/processor 440 are used for transmitting the first signaling in the disclosure.

In one embodiment, at least the former two of the receiver 456, the receiving processor 452 and the controller/processor 490 are used for receiving the first radio signal in the disclosure.

In one embodiment, at least the former two of the transmitter 416, the transmitting processor 415 and the controller/processor 440 are used for transmitting the first radio signal in the disclosure.

In one embodiment, at least the former two of the receiver 456, the receiving processor 452 and the controller/processor 490 are used for receiving the K0 piece(s) of information in the disclosure.

In one embodiment, at least the former two of the transmitter 416, the transmitting processor 415 and the controller/processor 440 are used for transmitting the K0 piece(s) of information in the disclosure.

In one embodiment, at least the former two of the transmitter 456, the transmitting processor 455 and the controller/processor 490 are used for transmitting the K radio signals in the disclosure and the first bit block in the disclosure in the K time-frequency resource groups in the disclosure.

In one embodiment, at least the former two of the receiver 416, the receiving processor 412 and the controller/processor 440 are used for receiving the K radio signals in the disclosure and the first bit block in the disclosure in the K time-frequency resource groups in the disclosure.

Embodiment 5

Figure 5:
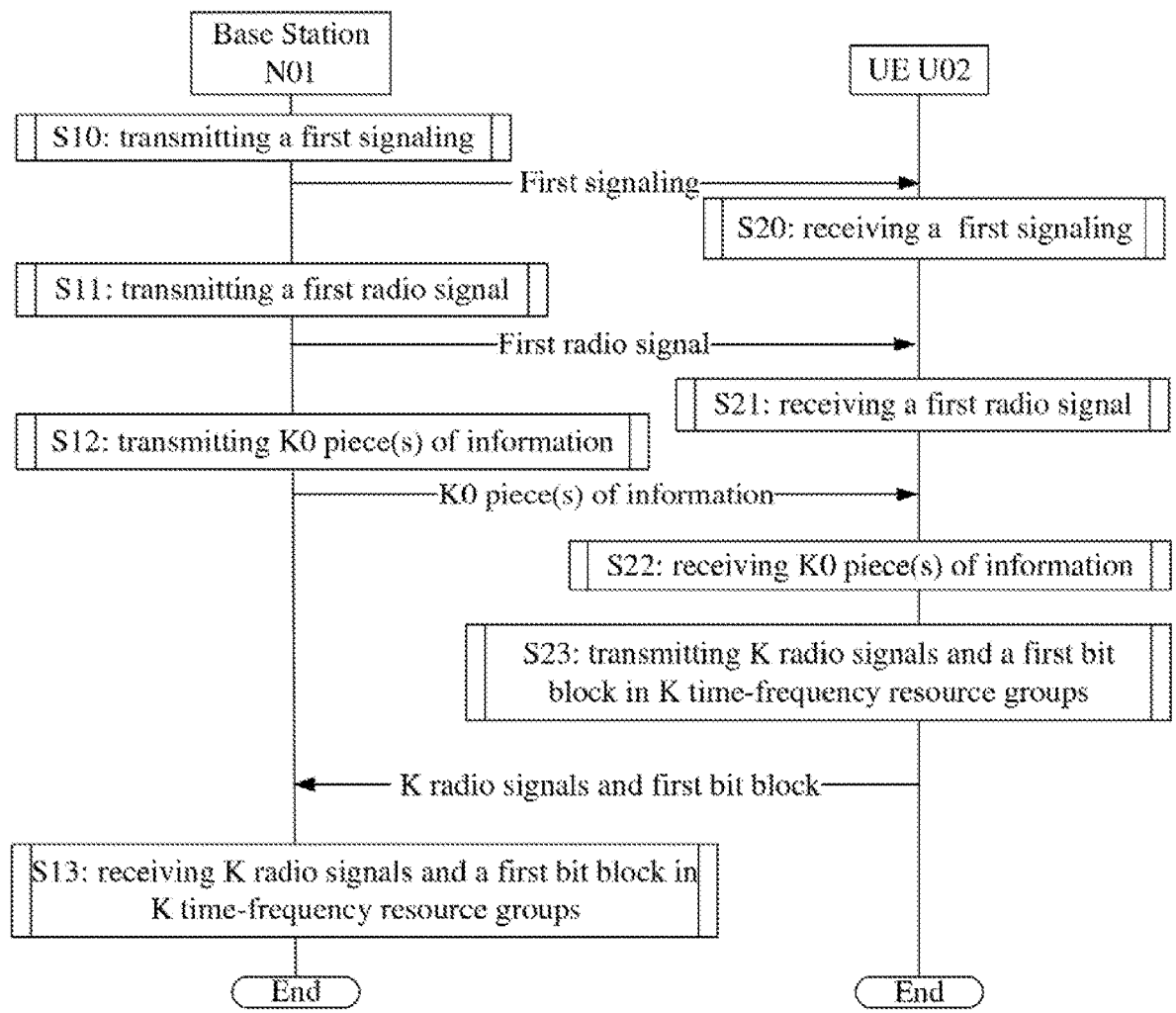
FIG. 5 is a flowchart of wireless transmission according to one embodiment of the disclosure.

Embodiment 5 illustrates an example of a flowchart of wireless transmission, as shown in FIG. 5. In FIG. 5, a base station N01 is a maintenance base station for a serving cell of a UE U02. In FIG. 5, boxes F1, F2 and F3 are optional.

The N01 transmits a first signaling in S10, transmits a first radio signal in S11, transmits K0 piece(s) of information in S12, and receives K radio signals and a first bit block in K time-frequency resource groups in S13.

The U02 receives a first signaling in S20, receives a first radio signal in S21, receives K0 piece(s) of information in S22, and transmits K radio signals and a first bit block in K time-frequency resource groups in S23.

In Embodiment 5, a first signaling is received, the first signaling is used for determining a first time-frequency resource group, and the first time-frequency resource group is reserved to transmission of a first bit block; K radio signals and the first bit block are transmitted in K time-frequency resource groups; time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K. The first bit block is related to the first radio signal. The K0 piece(s) of information is(are) used for determining the K time-frequency resource groups, and the K0 is a positive integer not greater than the K; the K0 is equal to the K and the K0 pieces of information are used for determining the K time-frequency resource groups respectively, or, the K0 is equal to 1 and a second bit block is used for generating any one of the K radio signals.

In one embodiment, the first radio signal includes data, and the first bit block is used for indicating whether the first radio signal is correctly received.

In one subembodiment, the first radio signal includes data and a DMRS.

In one subembodiment, the data included in the first radio signal is downlink data.

In one subembodiment, a transport channel of the first radio signal is a DL-SCH.

In one subembodiment, the first radio signal is transmitted on a downlink physical layer data channel (that is, a downlink channel capable of carrying physical layer data)

In one subembodiment, the first radio signal is transmitted on a downlink physical layer data channel, and the downlink physical layer data channel is a PDSCH.

In one subembodiment, the first radio signal is transmitted on a downlink physical layer data channel, and the downlink physical layer data channel is an sPDSCH.

In one subembodiment, the first radio signal is transmitted on a downlink physical layer data channel, and the downlink physical layer data channel is an NR-PDSCH.

In one subembodiment, the first radio signal is transmitted on a downlink physical layer data channel, and the downlink physical layer data channel is an NB-PDSCH.

In one subembodiment, the first bit block indicates explicitly whether the first radio signal is correctly received.

In one subembodiment, the first bit block indicates implicitly whether the first radio signal is correctly received.

In one subembodiment, the first bit block carries a HARQ-ACK feedback for the first radio signal.

In one subembodiment, partial or all bits in the first bit block are a HARQ-ACK feedback for the first radio signal.

In one subembodiment, partial bits in the first bit block are a HARQ-ACK feedback for the first radio signal.

In one subembodiment, all bits in the first bit block are a HARQ-ACK feedback for the first radio signal.

In one subembodiment, the first signaling is used for indicating scheduling information of the first radio signal.

In one subembodiment, the scheduling information of the first radio signal includes at least one of occupied time-domain resources, occupied frequency-domain resources, an MCS, DMRS configuration information, a HARQ process number, an RV, a New Data Indicator (NDI), a transmitting antenna port, corresponding multi-antenna related transmitting and corresponding multi-antenna related receiving; and the DMRS configuration included in the scheduling information of the first radio signal includes at least one of an RS sequence, a mapping mode, a DMRS type, occupied time-domain resources, occupied frequency-domain resources, occupied code-domain resources, a cyclic shift and an Orthogonal Cover Code (OCC).

In one embodiment, the first radio signal includes a reference signal, and the first bit block is used for indicating a CSI obtained based on a measurement of the first radio signal.

In one subembodiment, the reference signal included in the first radio signal includes a Channel State Information-Reference Signal (CSI-RS).

In one subembodiment, the reference signal included in the first radio signal includes a Channel State Information-Reference Signal (CSI-RS) and a CSI-interference measurement resource (CSI-IMR).

In one subembodiment, the first radio signal includes a CSI-RS.

In one subembodiment, the first radio signal includes a CSI-RS and a CSI-IMR.

In one subembodiment, the CSI includes at least one of a Rank Indication (RI), a Precoding Matrix Indicator (PMI), a Channel Quality Indicator (CQI), a Csi-reference signal Resource Indicator (CRI) and a Reference Signal Received Power (RSRP).

In one subembodiment, the first bit block carries a CSI feedback.

In one subembodiment, the measurement of the first radio signal includes a channel measurement, and the channel measurement is used for generating the CSI.

In one subembodiment, the measurement of the first radio signal includes an interference measurement, and the interference measurement is used for generating the CSI.

In one subembodiment, the measurement of the first radio signal includes a channel measurement and an interference channel, and the channel measurement and the interference channel are used for generating the CSI.

In one subembodiment, the first signaling is used for determining configuration information of the first radio signal, and the configuration information of the first radio signal is configured through a higher-layer signaling.

In one subembodiment, the first signaling includes a first field, the first field included in the first signaling is used for indicating a feedback of a first CSI, and the first bit block carries the first CSI feedback; a correspondence between the first radio signal and the first CSI is configured through a higher-layer signaling.

In one subembodiment, the first field included in the first signaling is used for determining a first CSI from a first CSI set, the first CSI set includes a positive integer number of CSIs, the first CSI is one CSI in the first CSI set, and the first bit block carries the first CSI feedback; a correspondence between the first radio signal and the first CSI is configured through a higher-layer signaling.

In one subembodiment, the first field included in the first signaling indicates an index of a first CSI in a first CSI set, the first CSI set includes a positive integer number of CSIs, the first CSI is one CSI in the first CSI set, and the first bit block carries the first CSI feedback; a correspondence between the first radio signal and the first CSI is configured through a higher-layer signaling.

In one subembodiment, the first field included in the first signaling is a CSI request field, and specific definitions of the CSI request field can refer to Chapter 7.3.1.1 in 3GPP TS38.212.

In one subembodiment, the configuration information of the first radio signal is configured through a higher-layer signaling.

In one subembodiment, the configuration information of the first radio signal includes at least one of occupied time-domain resources, occupied frequency-domain resources, occupied time-domain resources, a cyclic shift, an OCC, occupied antenna ports, a transmitting type, corresponding multi-antenna related transmitting and corresponding multi-antenna related receiving.

In one embodiment, the K0 piece(s) of information is(are) configured semi-statically.

In one embodiment, the K0 piece(s) of information is(are) carried by a higher-layer signaling.

In one embodiment, the K0 piece(s) of information is(are) carried by an RRC signaling.

In one embodiment, the K0 piece(s) of information is(are) carried by an MAC CE signaling.

In one embodiment, the K0 piece(s) of information include(s) one or more IEs in one RRC signaling.

In one embodiment, the K0 piece(s) of information include(s) partial or the entirety of one IE in one RRC signaling.

In one embodiment, the K0 piece(s) of information include(s) partial fields in one IE in one RRC signaling.

In one embodiment, the K0 piece(s) of information include(s) multiple IEs in one RRC signaling.

In one embodiment, the K0 piece(s) of information include(s) partial fields in a ConfiguredGrantConfig IE in one RRC signaling, and specific definitions of the ConfiguredGrantConfig IE can refer to Chapter 6.3.2 in 3GPP TS38.331.

In one embodiment, the K0 piece(s) of information include(s) a frequencyDomainAllocation field and a timeDomainAllocation field in a ConfiguredGrantConfig IE, and specific definitions of the ConfiguredGrantConfig IE, the frequencyDomainAllocation field and the timeDomainAllocation field can refer to Chapter 6.3.2 in 3GPP TS38.331.

In one embodiment, the K0 piece(s) of information is(are) configured dynamically.

In one embodiment, the K0 piece(s) of information is(are) carried by a physical layer signaling.

In one embodiment, the K0 is equal to 1, and the K0 piece of information is carried by a DCI signaling.

In one embodiment, the K0 is greater than 1, and the K0 pieces of information are carried by K0 DCI signalings respectively.

In one embodiment, the K0 is equal to 1, and the K0 piece of information is carried by a DCI signaling for uplink grant.

In one embodiment, the K0 is greater than 1, and the K0 pieces of information are carried by K0 DCI signalings for uplink grant respectively.

In one embodiment, reference information is one of the K0 piece(s) of information, the reference information includes a Frequency domain resource assignment field and a Time domain resource assignment filed in a DCI signaling, and specific definitions of the Frequency domain resource assignment field and the Time domain resource assignment filed can refer to Chapter 6.1.2 in 3GPP TS38.214.

In one embodiment, the K0 piece(s) of information is(are) transmitted on a downlink physical layer control channel (that is, a downlink channel capable of carrying physical layer signalings only).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the K0 piece(s) of information is(are) transmitted on a downlink physical layer data channel (that is, a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, the K0 is equal to the K, and the K0 pieces of information are used for determining the K time-frequency resource groups respectively.

In one subembodiment, the K0 pieces of information are used for determining time-domain resources and frequency-domain resources occupied respectively by the K time-frequency resource groups respectively.

In one subembodiment, the K0 pieces of information are used for indicating time-domain resources and frequency-domain resources occupied respectively by the K time-frequency resource groups respectively.

In one subembodiment, the K0 pieces of information indicate explicitly time-domain resources and frequency-domain resources occupied respectively by the K time-frequency resource groups respectively.

In one subembodiment, the K0 pieces of information indicate implicitly time-domain resources and frequency-domain resources occupied respectively by the K time-frequency resource groups respectively.

In one embodiment, the K0 is equal to 1, the K0 piece of information is used for determining time-domain resources and frequency-domain resources occupied respectively by the K time-frequency resource groups.

In one embodiment, the K0 is equal to 1, the K0 piece of information is used for determining time-domain resources and frequency-domain resources occupied by a given time-frequency resource group, the given time-frequency resource group is one of the K time-frequency resource groups.

In one subembodiment, the given time-frequency resource group is one earliest time-frequency resource group in time domain among the K time-frequency resource groups.

In one subembodiment, the given time-frequency resource group is not one earliest time-frequency resource group in time domain among the K time-frequency resource groups.

In one subembodiment, time-domain resources and frequency-domain resources occupied by the given time-frequency resource group can be used for deducing time-domain resources and frequency-domain resources occupied by any one of the K time-frequency resource groups other than the given time-frequency resource group.

In one subembodiment, time-domain resources occupied respectively by the K time-frequency resource groups belong to K time-domain resource units respectively, any two of the K time-domain resource units are orthogonal, relative positions of the time-domain resources occupied respectively by the K time-frequency resource groups in respective owned time-domain resource units are the same, the K0 piece(s) of information include(s) the relative position of the time-domain resources occupied by the given time-frequency resource group in one owned time-domain resource unit among the K time-domain resource units, and the relative position includes an index of an occupied start multicarrier symbol and a number of occupied multicarrier symbols.

In one subembodiment, time-domain resources occupied respectively by the K time-frequency resource groups belong to K time-domain resource units respectively, any two of the K time-domain resource units are orthogonal, relative positions of the time-domain resources occupied respectively by the K time-frequency resource groups in respective owned time-domain resource units are the same, the K0 piece(s) of information include(s) the relative position of the time-domain resources occupied by the given time-frequency resource group in one owned time-domain resource unit among the K time-domain resource units, and the relative position includes a set of indexes of occupied multicarrier symbols.

In one subembodiment, time-domain resources occupied respectively by the K time-frequency resource groups are consecutive, and (K−1) time-frequency resource group(s) among the K time-frequency resource groups other than the given time-frequency resource group is(are) consecutively distributed with the given time-frequency resource group in time domain.

In one subembodiment, frequency-domain resources occupied by any one of the K time-frequency resource groups other than the given time-frequency resource group are the same as the frequency-domain resources occupied by the given time-frequency resource group.

In one subembodiment, frequency-domain resources occupied by any one of the K time-frequency resource groups other than the given time-frequency resource group are an offset of the frequency-domain resources occupied by the given time-frequency resource group.

In one subembodiment, frequency-domain resources occupied by at least one of the K time-frequency resource groups other than the given time-frequency resource group are an offset of the frequency-domain resources occupied by the given time-frequency resource group.

In one embodiment, the time-domain resource unit consists of a positive integer number of consecutive multicarrier symbols.

In one embodiment, the time-domain resource unit includes one slot.

In one embodiment, the time-domain resource unit includes one subframe.

In one embodiment, the time-domain resource unit includes one mini-slot.

In one embodiment, the second bit block includes one TB.

In one embodiment, the K0 is equal to the K, and the K0 pieces of information are used for determining the K time-frequency resource groups respectively.

In one embodiment, the K0 is equal to 1, and a second bit block is used for generating any one of the K radio signals.

In one subembodiment, the K radio signals include an initial transmission and (K−1) retransmission(s) of the second bit block respectively.

In one subembodiment, one of the K radio signals that is transmitted earliest in time domain includes an initial transmission of the second bit block.

In one subembodiment, (K−1) radio signal(s) among the K radio signals other than the earliest radio signal transmitted in time domain include(s) retransmission(s) of the second bit block respectively.

In one subembodiment, the second bit block is processed in sequence through CRC insertion, channel coding, rate matching, scrambling, modulation, layer mapping, precoding, mapping to resource element, OFDM baseband signal generation, and modulation and upconversion to obtain one of the K radio signals.

In one subembodiment, the second bit block is processed in sequence through CRC insertion, channel coding, rate matching, scrambling, modulation, layer mapping, precoding, mapping to virtual resource blocks, mapping from virtual to physical resource blocks, OFDM baseband signal generation, and modulation and upconversion to obtain one of the K radio signals.

In one subembodiment, the second bit block is processed in sequence through CRC insertion, segmentation, coding block-level CRC insertion, channel coding, rate matching, concatenation, scrambling, modulation, layer mapping, precoding, mapping to resource element, OFDM baseband signal generation, and modulation and upconversion to obtain one of the K radio signals.

In one subembodiment, the second bit block is processed in sequence through CRC insertion, segmentation, coding block-level CRC insertion, channel coding, rate matching, concatenation, scrambling, modulation, layer mapping, precoding, mapping to virtual resource blocks, mapping from virtual to physical resource blocks, OFDM baseband signal generation, and modulation and upconversion to obtain one of the K radio signals.

In one subembodiment, the second bit block is processed in sequence through CRC insertion, channel coding, rate matching, scrambling, modulation, layer mapping, transform precoding, precoding, mapping to resource element, OFDM baseband signal generation, and modulation and upconversion to obtain one of the K radio signals.

In one subembodiment, the second bit block is processed in sequence through CRC insertion, channel coding, rate matching, scrambling, modulation, layer mapping, transform precoding, precoding, mapping to virtual resource blocks, mapping from virtual to physical resource blocks, OFDM baseband signal generation, and modulation and upconversion to obtain one of the K radio signals.

In one subembodiment, the second bit block is processed in sequence through CRC insertion, segmentation, coding block-level CRC insertion, channel coding, rate matching, concatenation, scrambling, modulation, layer mapping, transform precoding, precoding, mapping to resource element, OFDM baseband signal generation, and modulation and upconversion to obtain one of the K radio signals.

In one subembodiment, the second bit block is processed in sequence through CRC insertion, segmentation, coding block-level CRC insertion, channel coding, rate matching, concatenation, scrambling, modulation, layer mapping, transform precoding, precoding, mapping to virtual resource blocks, mapping from virtual to physical resource blocks, OFDM baseband signal generation, and modulation and upconversion to obtain one of the K radio signals.

Embodiment 6

Figure 6:
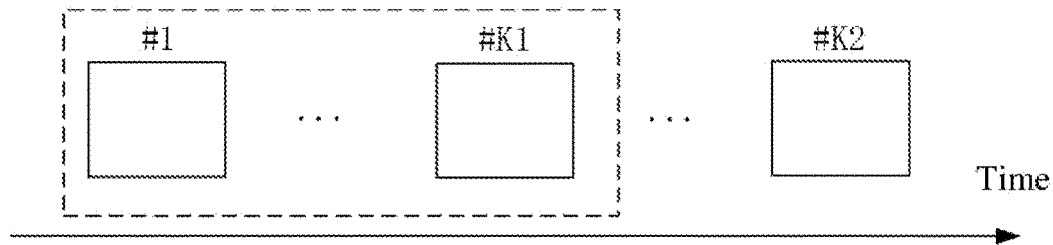
FIG. 6 is a diagram illustrating the determination of K1 time-frequency resource groups according to one embodiment of the disclosure.

Embodiment 6 illustrates an example of a diagram of the determination of K1 time-frequency resource groups, as shown in FIG. 6.

In Embodiment 6, when the first signaling in the disclosure corresponds to the first type in the disclosure, the K1 time-frequency resource groups are K1 earliest time-frequency resource groups in time domain among K2 time-frequency resource groups respectively; each of the K2 time-frequency resource groups is one of the K time-frequency resource groups in the disclosure, and the K2 is a positive integer not less than the K1 but not greater than the K; the K2 is equal to the K and the K2 time-frequency resource groups are the K time-frequency resource groups respectively; or, the K2 time-frequency resource groups are all time-frequency resource groups overlapping with the first time-frequency resource group in time domain among the K time-frequency resource groups.

In one embodiment, the K2 is equal to the K.
In one embodiment, the K2 is less than the K.
In one embodiment, the K2 is equal to the K1.
In one embodiment, the K2 is greater than the K1.
In one embodiment, any one of the K2 time-frequency resource groups that does not belong to the K1 time-frequency resource groups is later than each of the K1 time-frequency resource groups in time domain.

In one embodiment, the K2 is equal to the K, and the K2 time-frequency resource groups are the K time-frequency resource groups respectively.

In one embodiment, the K2 time-frequency resource groups are all time-frequency resource groups overlapping with the first time-frequency resource group in time domain among the K time-frequency resource groups.

In one subembodiment, the K2 is equal to the K.
In one subembodiment, the K2 is less than the K.
In one subembodiment, the first time-frequency resource group is partially or totally overlapping with any one of the K2 time-frequency resource groups in time domain.

In one subembodiment, the first time-frequency resource group and any one of the K2 time-frequency resource groups include at least one same multicarrier symbol in time domain.

In one subembodiment, the first time-frequency resource group is partially overlapping with each of the K2 time-frequency resource groups in time domain.

In one subembodiment, the first time-frequency resource group and each of the K2 time-frequency resource groups include at least one same multicarrier symbol and at least one different multicarrier symbol in time domain.

In one subembodiment, the first time-frequency resource group is partially overlapping with at least one of the K2 time-frequency resource groups in time domain.

In one subembodiment, the first time-frequency resource group and at least one of the K2 time-frequency resource groups include at least one same multicarrier symbol and at least one different multicarrier symbol in time domain.

In one subembodiment, the first time-frequency resource group is totally overlapping with each of the K2 time-frequency resource groups in time domain.

In one subembodiment, the first time-frequency resource group and each of the K2 time-frequency resource groups include totally same multicarrier symbols in time domain.

In one subembodiment, the first time-frequency resource group is totally overlapping with at least one of the K2 time-frequency resource groups in time domain.

In one subembodiment, the first time-frequency resource group and at least one of the K2 time-frequency resource groups include totally same multicarrier symbols in time domain.

Embodiment 7

Figure 7:
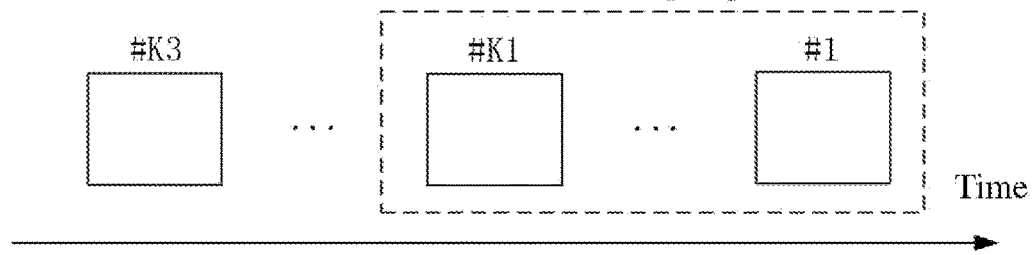
FIG. 7 is a diagram illustrating the determination of K1 time-frequency resource groups according to another embodiment of the disclosure.

Embodiment 7 illustrates another example of a diagram of the determination of K1 time-frequency resource groups, as shown in FIG. 7.

In Embodiment 7, when the first signaling in the disclosure corresponds to the second type in the disclosure, the K1 time-frequency resource groups are K1 latest time-frequency resource groups in time domain among K3 time-frequency resource groups respectively; each of the K3 time-frequency resource groups is one of the K time-frequency resource groups in the disclosure, and the K3 is a positive integer not less than the K1 but not greater than the K; the K3 is equal to the K and the K3 time-frequency resource groups are the K time-frequency resource groups respectively; or, the K3 time-frequency resource groups are all time-frequency resource groups overlapping with the first time-frequency resource group in time domain among the K time-frequency resource groups.

In one embodiment, the K3 is equal to the K.
In one embodiment, the K3 is less than the K.

In one embodiment, the K3 is equal to the K1.

In one embodiment, the K3 is greater than the K1.

In one embodiment, any one of the K3 time-frequency resource groups that does not belong to the K1 time-frequency resource groups is earlier than each of the K1 time-frequency resource groups in time domain.

In one embodiment, the K3 is equal to the K, and the K3 time-frequency resource groups are the K time-frequency resource groups respectively.

In one embodiment, the K3 time-frequency resource groups are all time-frequency resource groups overlapping with the first time-frequency resource group in time domain among the K time-frequency resource groups.

In one subembodiment, the K3 is equal to the K.

In one subembodiment, the K3 is less than the K.

In one subembodiment, the first time-frequency resource group is partially or totally overlapping with any one of the K3 time-frequency resource groups in time domain.

In one subembodiment, the first time-frequency resource group and any one of the K3 time-frequency resource groups include at least one same multicarrier symbol in time domain.

In one subembodiment, the first time-frequency resource group is partially overlapping with each of the K3 time-frequency resource groups in time domain.

In one subembodiment, the first time-frequency resource group and each of the K3 time-frequency resource groups include at least one same multicarrier symbol and at least one different multicarrier symbol in time domain.

In one subembodiment, the first time-frequency resource group is partially overlapping with at least one of the K3 time-frequency resource groups in time domain.

In one subembodiment, the first time-frequency resource group and at least one of the K3 time-frequency resource groups include at least one same multicarrier symbol and at least one different multicarrier symbol in time domain.

In one subembodiment, the first time-frequency resource group is totally overlapping with each of the K3 time-frequency resource groups in time domain.

In one subembodiment, the first time-frequency resource group and each of the K3 time-frequency resource groups include totally same multicarrier symbols in time domain.

In one subembodiment, the first time-frequency resource group is totally overlapping with at least one of the K3 time-frequency resource groups in time domain.

In one subembodiment, the first time-frequency resource group and at least one of the K3 time-frequency resource groups include totally same multicarrier symbols in time domain.

Embodiment 8

Embodiment 8 illustrates an example of a diagram of an MCS employed by a first radio signal, as shown in FIG. 8.

In Embodiment 8, the first bit block in the disclosure is used for indicating whether the first radio signal is correctly received; when the first signaling in the disclosure corresponds to the first type in the disclosure, the first signaling is used for indicating an MCS employed by the first radio signal from a first MCS set; when the first signaling corresponds to the second type in the disclosure, the first signaling is used for indicating an MCS employed by the first radio signal from a second MCS set; and a target BLER of the first MCS set is less than a target BLER of the second MCS set.

In one embodiment, the first MCS set includes a positive integer number of MCSs.

In one embodiment, the second MCS set includes a positive integer number of MCSs.

In one embodiment, a target BLER of the second MCS set is equal to 0.1.

In one embodiment, a target BLER of the second MCS set is less than 0.1.

In one embodiment, a target BLER of the first MCS set is less than 0.1.

In one embodiment, a target BLER of the first MCS set is equal to 0.00001.

In one embodiment, a target BLER of the first MCS set is less than 0.00001.

In one embodiment, a target BLER of the first MCS set is equal to 0.000001.

In one embodiment, a target BLER of the first MCS set is less than 0.000001.

In one embodiment, the first signaling includes a second field, and the second field included in the first signaling is used for indicating an MCS employed by the first radio signal.

In one subembodiment, the second field included in the first signaling includes a positive integer number of bits.

In one subembodiment, when the first signaling corresponds to the first type, the second field included in the first signaling indicates an index of an MCS employed by the first radio signal in the first MCS set.

In one subembodiment, when the first signaling corresponds to the second type, the second field included in the first signaling indicates an index of an MCS employed by the first radio signal in the second MCS set.

In one subembodiment, the second field included in the first signaling is Modulation and coding scheme, and specific definitions of the Modulation and coding scheme can refer to Chapter 5.1.3 in 3GPP TS38.214.

Embodiment 9

Embodiment 9 illustrates an example of a diagram of the determination of K1, as shown in FIG. 9.

In Embodiment 9, the K1 is predefined, or the K1 is configurable, or a number of bits included in the first bit block in the disclosure is used for determining the K1

In one embodiment, the K1 is equal to 1.

In one embodiment, the K1 is greater than 1.

In one embodiment, the K1 is predefined.

In one embodiment, the K1 is configurable.

In one subembodiment, the K1 is configured through a higher-layer signaling.

In one subembodiment, the K1 is configured through an RRC signaling.

In one subembodiment, the K1 is configured through an MAC CE signaling.

In one subembodiment, the K1 is indicated through a DCI signaling.

In one subembodiment, the K1 is indicated through the K0 piece of information the K0 being equal to1.

In one embodiment, a number of bits included in the first bit block is used for determining the K1.

In one subembodiment, the K1 is greater than 1, the first bit block includes K1 bit subblocks, and the K1 bit subblocks are transmitted in the K1 time-frequency resource groups respectively.

In one subembodiment, the K1 is greater than 1, the first bit block includes K1 bit subblocks, the K1 bit subblocks are transmitted in the K1 time-frequency resource groups respectively, and the K1 bit subblocks include a same number of bits.

In one subembodiment, the K1 is greater than 1, the first bit block includes K1 bit subblocks, the K1 bit subblocks are transmitted in the K1 time-frequency resource groups respectively, and numbers of bits included respectively in the K1 bit subblocks are respectively related to a number of time-frequency resources in the K1 time-frequency resource groups that can be used for transmitting the bits in the first bit block.

In one subembodiment, when the first signaling corresponds to the first type, a number of bits included in the first bit block and a number of time-frequency resources in each of the K2 time-frequency resource groups that can be used for transmitting the bits in the first bit bock are used together to determine the K1.

In one subembodiment, when the first signaling corresponds to the first type, according to the order from earliest to latest of the K2 time-frequency resource groups in time domain, the bits in the first bit block are successively assigned to the K1 earliest time-frequency resource groups in time domain among the K2 time-frequency resource groups.

In one subembodiment, when the first signaling corresponds to the first type, according to the order from earliest to latest of the K2 time-frequency resource groups in time domain, the bits in the first bit block are successively and evenly assigned to the K1 earliest time-frequency resource groups in time domain among the K2 time-frequency resource groups.

In one subembodiment, when the first signaling corresponds to the first type, according to the order from earliest to latest of the K2 time-frequency resource groups in time domain, the bits in the first bit block are successively assigned to the K1 earliest time-frequency resource groups in time domain among the K2 time-frequency resource groups, the numbers of bits in the first bit block assigned respectively to the K1 time-frequency resource groups are related to a number of time-frequency resources in the K1 time-frequency resource groups that can be used for transmitting the bits in the first bit block.

In one subembodiment, when the first signaling corresponds to the first type, the K1 is greater than 1, (K1-1) earliest time-frequency resource groups in time domain among the K2 time-frequency resource groups can only be used for transmitting partial bits in the first bit block, and K1 earliest time-frequency resource groups in time domain among the K2 time-frequency resource groups can be used for transmitting all bits in the first bit block.

In one subembodiment, when the first signaling corresponds to the first type, the K1 is equal to the K2, the K1 time-frequency resource groups can only be used for transmitting partial bits in the first bit block, and give up transmitting all the bits in the first bit block that cannot be transmitted in the K1 time-frequency resource groups.

In one subembodiment, when the first signaling corresponds to the second type, a number of bits included in the first bit block and a number of time-frequency resources in each of the K3 time-frequency resource groups that can be used for transmitting the bits in the first bit bock are used together to determine the K1.

In one subembodiment, when the first signaling corresponds to the second type, according to the order from latest to earliest of the K3 time-frequency resource groups in time domain, the bits in the first bit block are successively assigned to the K1 latest time-frequency resource groups in time domain among the K3 time-frequency resource groups.

In one subembodiment, when the first signaling corresponds to the second type, according to the order from latest to earliest of the K3 time-frequency resource groups in time domain, the bits in the first bit block are successively and evenly assigned to the K1 latest time-frequency resource groups in time domain among the K3 time-frequency resource groups.

In one subembodiment, when the first signaling corresponds to the second type, according to the order from latest to earliest of the K3 time-frequency resource groups in time domain, the bits in the first bit block are successively assigned to the K1 latest time-frequency resource groups in time domain among the K3 time-frequency resource groups, the numbers of bits in the first bit block assigned respectively to the K1 time-frequency resource groups are related to a number of time-frequency resources in the K1 time-frequency resource groups that can be used for transmitting the bits in the first bit block.

In one subembodiment, when the first signaling corresponds to the second type, the K1 is greater than 1, (K1-1) latest time-frequency resource groups in time domain among the K3 time-frequency resource groups can only be used for transmitting partial bits in the first bit block, and K1 latest time-frequency resource groups in time domain among the K3 time-frequency resource groups can be used for transmitting all bits in the first bit block.

In one subembodiment, when the first signaling corresponds to the second type, the K1 is equal to the K3, the K1 time-frequency resource groups can only be used for transmitting partial bits in the first bit block, and give up transmitting all the bits in the first bit block that cannot be transmitted in the K1 time-frequency resource groups.

Embodiment 10

Figure 10:
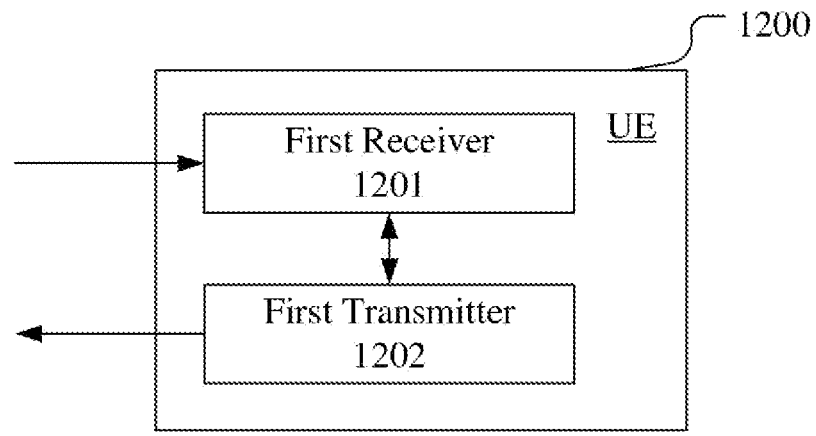
FIG. 10 is a structure block diagram illustrating a processing device in a UE according to one embodiment of the disclosure.

Embodiment 10 illustrates an example of a structure block diagram of a processing device in a UE, as shown in FIG. 10. In FIG. 10, the processing device 1200 in the UE includes a first receiver 1201 and a first transmitter 1202.

In one embodiment, the first receiver 1201 includes the receiver 456, the receiving processor 452 and the controller/processor 490 illustrated in Embodiment 4.

In one embodiment, the first receiver 1201 includes at least the former two of the receiver 456, the receiving processor 452 and the controller/processor 490 illustrated in Embodiment 4.

In one embodiment, the first transmitter 1202 includes the transmitter 456, the transmitting processor 455 and the controller/processor 490 illustrated in Embodiment 4.

In one embodiment, the first transmitter 1202 includes at least the former two of the transmitter 456, the transmitting processor 455 and the controller/processor 490 illustrated in Embodiment 4.

The first receiver 1201 receives a first signaling.

The first transmitter 1202 transmits K radio signals and a first bit block in K time-frequency resource groups.

In Embodiment 10, the first signaling is used for determining a first time-frequency resource group, and the first time-frequency resource group is reserved to transmission of the first bit block; time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

In one embodiment, when the first signaling corresponds to the first type, the K1 time-frequency resource group(s) is(are) K1 earliest time-frequency resource group(s) in time domain among K2 time-frequency resource group(s) respectively; each of the K2 time-frequency resource group(s) is one of the K time-frequency resource groups, and the K2 is a positive integer not less than the K1 but not greater than the K; the K2 is equal to the K and the K2 time-frequency resource groups are the K time-frequency resource groups respectively; or, the K2 time-frequency resource group(s) is(are) all time-frequency resource groups overlapping with the first time-frequency resource group in time domain among the K time-frequency resource groups.

In one embodiment, when the first signaling corresponds to the second type, the K1 time-frequency resource group(s) is(are) K1 latest time-frequency resource group(s) in time domain among K3 time-frequency resource group(s) respectively; each of the K3 time-frequency resource group(s) is one of the K time-frequency resource groups, and the K3 is a positive integer not less than the K1 but not greater than the K; the K3 is equal to the K and the K3 time-frequency resource groups are the K time-frequency resource groups respectively; or, the K3 time-frequency resource group(s) is(are) all time-frequency resource groups overlapping with the first time-frequency resource group in time domain among the K time-frequency resource groups.

In one embodiment, the first receiver 1201 further receives a first radio signal; and the first bit block is related to the first radio signal.

In one embodiment, the first bit block is used for indicating whether the first radio signal is correctly received; when the first signaling corresponds to the first type, the first signaling is used for indicating an MCS employed by the first radio signal from a first MCS set; when the first signaling corresponds to the second type, the first signaling is used for indicating an MCS employed by the first radio signal from a second MCS set; and a target Block Error Rate (BLER) of the first MCS set is less than a target BLER of the second MCS set.

In one embodiment, the K1 is predefined, or the K1 is configurable, or a number of bits included in the first bit block is used for determining the K1.

In one embodiment, the first receiver 1201 further receives K0 piece(s) of information; the K0 piece(s) of information is(are) used for determining the K time-frequency resource groups, and the K0 is a positive integer not greater than the K; the K0 is equal to the K and the K0 pieces of information are used for determining the K time-frequency resource groups respectively, or, the K0 is equal to 1 and a second bit block is used for generating any one of the K radio signals.

Embodiment 11

Figure 11:
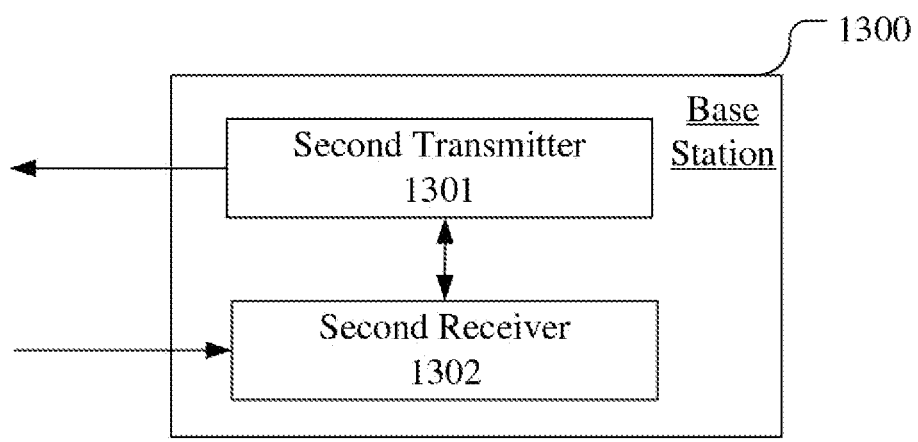
FIG. 11 is a structure block diagram illustrating a processing device in a base station according to one embodiment of the disclosure.

Embodiment 11 illustrates an example of a structure block diagram of a processing device in a base station, as shown in FIG. 11. In FIG. 11, the processing device 1300 in the base station includes a second transmitter 1301 and a second receiver 1302.

In one embodiment, the second transmitter 1301 includes the transmitter 416, the transmitting processor 415 and the controller/processor 440 illustrated in Embodiment 4.

In one embodiment, the second transmitter 1301 includes at least the former two of the transmitter 416, the transmitting processor 415 and the controller/processor 440 illustrated in Embodiment 4.

In one embodiment, the second receiver 1302 includes the receiver 416, the receiving processor 412 and the controller/processor 440 illustrated in Embodiment 4.

In one embodiment, the second receiver 1302 includes at least the former two of the receiver 416, the receiving processor 412 and the controller/processor 440 illustrated in Embodiment 4.

The second transmitter 1301 transmits a first signaling.

The second receiver 1302 receives K radio signals and a first bit block in K time-frequency resource groups.

In Embodiment 11, the first signaling is used for determining a first time-frequency resource group, and the first time-frequency resource group is reserved to transmission of the first bit block; time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K.

In one embodiment, when the first signaling corresponds to the first type, the K1 time-frequency resource group(s) is(are) K1 earliest time-frequency resource group(s) in time domain among K2 time-frequency resource group(s) respectively; each of the K2 time-frequency resource group(s) is one of the K time-frequency resource groups, and the K2 is a positive integer not less than the K1 but not greater than the K; the K2 is equal to the K and the K2 time-frequency resource groups are the K time-frequency resource groups respectively; or, the K2 time-frequency resource group(s) is(are) all time-frequency resource groups overlapping with the first time-frequency resource group in time domain among the K time-frequency resource groups.

In one embodiment, when the first signaling corresponds to the second type, the K1 time-frequency resource group(s) is(are) K1 latest time-frequency resource group(s) in time domain among K3 time-frequency resource group(s) respectively; each of the K3 time-frequency resource group(s) is one of the K time-frequency resource groups, and the K3 is a positive integer not less than the K1 but not greater than the K; the K3 is equal to the K and the K3 time-frequency resource groups are the K time-frequency resource groups respectively; or, the K3 time-frequency resource group(s) is(are) all time-frequency resource groups overlapping with the first time-frequency resource group in time domain among the K time-frequency resource groups.

In one embodiment, the second transmitter 1301 further transmits a first radio signal, wherein the first bit block is related to the first radio signal.

In one embodiment, the first bit block is used for indicating whether the first radio signal is correctly received; when the first signaling corresponds to the first type, the first signaling is used for indicating a MCS employed by the first radio signal from a first MCS set; when the first signaling corresponds to the second type, the first signaling is used for indicating an MCS employed by the first radio signal from a second MCS set; and a target BLER of the first MCS set is less than a target BLER of the second MCS set.

In one embodiment, the K1 is predefined, or the K1 is configurable, or a number of bits included in the first bit block is used for determining the K1.

In one embodiment, the second transmitter 1301 further transmits K0 piece(s) of information, wherein the K0 piece(s) of information is(are) used for determining the K time-frequency resource groups, and the K0 is a positive integer not greater than the K; the K0 is equal to the K and the K0 pieces of information are used for determining the K time-frequency resource groups respectively, or, the K0 is equal to 1 and a second bit block is used for generating any one of the K radio signals.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station or system in the disclosure includes but not limited to macro-cellular base stations, micro-cellular base stations, home base stations, relay base station, gNB (NR Node B), TRP and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A User Equipment (UE) for wireless communication, comprising:
    a first receiver, to receive a first signaling, the first signaling being used for determining a first time-frequency resource group, and the first time-frequency resource group being reserved for transmission of a first bit block;
    to receive a first radio signal; and a first transmitter, to transmit K radio signals and the first bit block in K time-frequency resource groups; wherein time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K;
    the first signaling is a Downlink Control Information (DCI) signaling; the K time-frequency resource groups all include time-frequency resources belonging to a PUSCH; the first radio signal includes a CSI-RS (Channel State Information-Reference Signal), and the first bit block is used for indicating a CSI (Channel State Information) obtained based on a measurement of the first radio signal;
    when the first signaling corresponds to the first type, the KI time-frequency resource group(s) is(are) KI earliest time-frequency resource group(s) in time domain among K2 time-frequency resource group(s) respectively; each of the K2 time-frequency resource group(s) is one of the K time-frequency resource groups, and the K2 is a positive integer not less than the K1 but not greater than the K; the K2 is equal to the K and the K2 time-frequency resource groups are the K time-frequency resource groups respectively; or, the K2 time-frequency resource group(s) is (are) all time-frequency resource groups overlapping with the first time-frequency resource group in time domain among the K time-frequency resource groups;
    when the first signaling corresponds to the second type, the K1 time-frequency resource group(s) is (are) K1 latest time-frequency resource group(s) in time domain among K3 time-1 frequency resource group(s) respectively; each of the K3 time-frequency resource group(s) is one of the K time-frequency resource groups, and the K3 is a positive integer not less than the K1 but not greater than the K; the K3 is equal to the K and the K3 time-frequency resource groups are the K time-frequency resource groups respectively; or, the K3 time-frequency resource group(s) is(are) all time-frequency resource groups overlapping with the first time-frequency resource group in time domain among the K time-frequency resource groups; the K1 is equal to 1, or the K1 is greater than 1, or the K1 is predefined, or the K1 is configurable, or a number of bits comprised in the first bit block is used for determining the K1.

2. The UE according to claim 1, wherein the first signaling includes a first field, the first field included in the first signaling is used for indicating a feedback of a first CSI, and the first CSI feedback is carried in the first bit block; the first field included in the first signaling is a CSI request field; the first field included in the first signaling includes a positive integer number of bit;
    when the first signaling corresponds to the first type, the K radio signals are K repeated transmissions of one TB (Transport Block); when the first signaling corresponds to the second type, K Transport Blocks are used for generating the K radio signals respectively.

3. The UE according to claim 1, wherein the first receiver further receives K0 piece(s) of information; the K0 piece(s) of information is (are) used for determining the K time-frequency resource groups, and the K0 is a positive integer not greater than the K; the K0 is equal to the K and the K0 pieces of information are used for determining the K time-frequency resource groups respectively, or, the K0 is equal to 1 and a second bit block is used for generating any one of the K radio signals.

4. The UE according to claim 1, wherein the phrase that the first signaling corresponds to a first type or a second type refers that: a signaling format of the first signaling is the first type or the second type; the first type and the second type are two different signaling formats, and both the first type and the second type are signaling formats for scheduling of PUSCH.

5. The UE according to claim 1, wherein J time-frequency resource groups are all time-frequency resource groups overlapping with the first time-frequency resource group in time domain among the K time-frequency resource groups, the J is equal to the K.

6. A base station for wireless communication, comprising:
a second transmitter, to transmit a first signaling, the first signaling being used for determining a first time-frequency resource group, and the first time-frequency resource group being reserved for transmission of a first bit block;
to transmit a first radio signal; and2 a second receiver, to receive K radio signals and the first bit block in K time-frequency resource groups; wherein time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the KI is a positive integer not greater than the K;
the first signaling is a Downlink Control Information (DCI) signaling; the K time-frequency resource groups all include time-frequency resources belonging to a PUSCH; the first radio signal includes a CSI-RS (Channel State Information-Reference Signal), and the first bit block is used for indicating a CSI (Channel State Information) obtained based on a measurement of the first radio signal;
when the first signaling corresponds to the first type, the K1 time-frequency resource group(s) is (are) K1 earliest time-frequency resource group(s) in time domain among K2 time-frequency resource group(s) respectively; each of the K2 time-frequency resource group(s) is one of the K time-frequency resource groups, and the K2 is a positive integer not less than the K1 but not greater than the K; the K2 is equal to the K and the K2 time-frequency resource groups are the K time-frequency resource groups respectively; or, the K2 time-frequency resource group(s) is (are) all time-frequency resource groups overlapping with the first time-frequency resource group in time domain among the K time-frequency resource groups;
when the first signaling corresponds to the second type, the K1 time-frequency resource group(s) is (are) K1 latest time-frequency resource group(s) in time domain among K3 time-frequency resource group(s) respectively; each of the K3 time-frequency resource group(s) is one of the K time-frequency resource groups, and the K3 is a positive integer not less than the K1 but not greater than the K; the K3 is equal to the K and the K3 time-frequency resource groups are the K time-frequency resource groups respectively; or, the K3 time-frequency resource group(s) is(are) all time-frequency resource groups overlapping with the first time-frequency resource group in time domain among the K time-frequency resource groups; the K1 is equal to 1, or the Ki is greater than 1, or the K1 is predefined, or the K1 is 3 configurable, or a number of bits comprised in the first bit block is used for determining the KI.

7. The base station according to claim 6, wherein the first signaling includes a first field, the first field included in the first signaling is used for indicating a feedback of a first CSI, and the first CSI feedback is carried in the first bit block; the first field included in the first signaling is a CSI request field; the first field included in the first signaling includes a positive integer number of bit;
when the first signaling corresponds to the first type, the K radio signals are K repeated transmissions of one TB (Transport Block); when the first signaling corresponds to the second type, K Transport Blocks are used for generating the K radio signals respectively.

8. The base station according to claim 6, wherein the second transmitter further transmits K0 piece(s) of information; the K0 piece(s) of information is (are) used for determining the K time-frequency resource groups, and the K0 is a positive integer not greater than the K; the K0 is equal to the K and the K0 pieces of information are used for determining the K time-frequency resource groups respectively, or, the K0 is equal to 1 and a second bit block is used for generating any one of the K radio signals.

9. The base station according to claim 6, wherein the phrase that the first signaling corresponds to a first type or a second type refers that: a signaling format of the first signaling is the first type or the second type; the first type and the second type are two different signaling formats, and both the first type and the second type are signaling formats for scheduling of PUSCH.

10. The base station according to claim 6, wherein J time-frequency resource groups are all time-frequency resource groups overlapping with the first time-frequency resource group in time domain among the K time-frequency resource groups, the J is equal to the K.

11. A method in a UE for wireless communication, comprising:
receiving a first signaling, the first signaling being used for determining a first time-frequency resource group, and the first time-frequency resource group being reserved for transmission of a first bit block; receiving a first radio signal; and
transmitting K radio signals and the first bit block in K time-frequency resource groups; wherein time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K;

the first signaling is a Downlink Control Information (DCI) signaling; the K time-frequency resource groups all include time-frequency resources belonging to a PUSCH; the first radio signal includes a CSI-RS (Channel State Information-Reference Signal), and the first bit block is used for indicating a CSI (Channel State Information) obtained based on a measurement of the first radio signal;

when the first signaling corresponds to the first type, the K1 time-frequency resource group(s) is(are) K1 earnest time-frequency resource group(s) in time domain among K2 time-frequency resource group(s) respectively; each of the K2 time-frequency resource group(s) is one of the K time-frequency resource groups, and the K2 is a positive integer not less than the K I but not greater than the K; the K2 is equal to the K and the K2 time-frequency resource groups are the K time-frequency resource groups respectively; or, the K2 time-frequency resource group(s) is (are) all time-frequency resource groups overlapping with the first time-frequency resource group in time domain among the K time-frequency resource groups;

when the first signaling corresponds to the second type, the K1 time-frequency resource group(s) is (are) K1 latest time-frequency resource group(s) in time domain among K3 time-frequency resource group(s) respectively; each of the K3 time-frequency resource group(s) is one of the K time-frequency resource groups, and the K3 is a positive integer not less than the K1 but not greater than the K; the K3 is equal to the K and the K3 time-frequency resource groups are the K time-frequency resource groups respectively; or, the K3 time-frequency resource group(s) is (are) all time-frequency resource groups overlapping with the first time-frequency resource group in time domain among the K time-frequency resource groups; the K1 is equal to 1, or the K1 is greater than 1, or the K1 is predefined, or the K1 is configurable, or a number of bits comprised in the first bit block is used for determining the K1.

12. The method according to claim 11, wherein the first signaling includes a first field, the first field included in the first signaling is used for indicating a feedback of a first CSI, and the first CSI feedback is carried in the first bit block; the first field included in the first signaling is a CSI request field; the first field included in the first signaling includes a positive integer number of bit;

when the first signaling corresponds to the first type, the K radio signals are K repeated transmissions of one TB (Transport Block); when the first signaling corresponds to the second type, K Transport Blocks are used for generating the K radio signals respectively.

13. The method according to claim 11, wherein the method comprises: receiving K0 piece(s) of information, wherein the K0 piece(s) of information is(are) used for determining the K time-frequency resource groups, and the K0 is a positive integer not greater than the K; the K0 is equal to the K and the K0 pieces of information are used for determining the K time-frequency resource groups respectively, or, the K0 is equal to 1 and a second bit block is used for generating any one of the K radio signals.

14. The method according to claim 11, wherein the phrase that the first signaling corresponds to a first type or a second type refers that: a signaling format of the first signaling is the first type or the second type; the first type and the second type are two different signaling formats, and both the first type and the second type are signaling formats for scheduling of PUSCH.

15. The method according to claim 11, wherein J time-frequency resource groups are all time-frequency resource groups overlapping with the first time-frequency resource group in time domain among the K time-frequency resource groups, the J is equal to the K.

16. A method in a base station for wireless communication, comprising:

transmitting a first signaling, the first signaling being used for determining a first time-frequency resource group, and the first time-frequency resource group being reserved for transmission of a first bit block;

transmitting a first radio signal; and receiving K radio signals and the first bit block in K time-frequency resource groups; wherein time-domain resources occupied by the first time-frequency resource group are overlapping with time-domain resources occupied by at least one of the K time-frequency resource groups, and any two of the K time-frequency resource groups are orthogonal in time domain; the K radio signals are transmitted in the K time-frequency resource groups respectively, and the first bit block is transmitted in only K1 time-frequency resource group(s) among the K time-frequency resource groups; the first signaling corresponds to a first type or a second type, and whether the first signaling corresponds to the first type or the second type is used for determining the K1 time-frequency resource group(s) from the K time-frequency resource groups; the K is a positive integer greater than 1, and the K1 is a positive integer not greater than the K;

the first signaling is a Downlink Control Information (DCI) signaling; the K time-frequency resource groups all include time-frequency resources belonging to a PUSCH; the first radio signal includes a CSI-RS (Channel State Information-Reference Signal), and the first bit block is used for indicating a CSI (Channel State Information) obtained based on a measurement of the first radio signal;

when the first signaling corresponds to the first type, the K1 time-frequency resource group(s) is (are) K1 earliest time-frequency resource group(s) in time domain among K2 time-frequency resource group(s) respectively; each of the K2 time-frequency resource group(s) is one of the K time-frequency resource groups, and K2 is a positive integer not less than the K1 but not greater than the K; the K2 is equal to the K and the K2 time-frequency resource groups are the K time-frequency resource groups respectively; or, the K2 time-frequency resource group(s) is (are) all time-frequency resource groups overlapping with the first time-frequency resource group in time domain among the K time-frequency resource groups;

when the first signaling corresponds to the second type, the K1 time-frequency resource group(s) is (are) K1 latest time-frequency resource group(s) in time domain among K3 time-frequency resource group(s) respectively; each of the K3 time-frequency resource group(s) is one of the K time-frequency resource groups, and the K3 is a positive integer not less than the K1 but not greater than the K; the K3 is equal to the K and the K3 time-frequency resource groups are the K time-frequency resource groups respectively; or, the K3 time-frequency resource group(s) is (are) all time-frequency resource groups overlapping with the first time-frequency resource group in time domain among the K time-frequency resource groups; the K1 is equal to 1, or the K1 is greater than 1, or the K1 is predefined, or the K1 is configurable, or a number of bits comprised in the first bit block is used for determining the KI.

17. The method according to claim 16, wherein the first signaling includes a first field, the first field included in the first signaling is used for indicating a feedback of a first CSI, and the first CSI feedback is carried in the first bit block; the first field included in the first signaling is a CSI request field; the first field included in the first signaling includes a positive integer number of bit;

when the first signaling corresponds to the first type, the K radio signals are K repeated transmissions of one TB (Transport Block); when the first signaling corresponds to the second type, K Transport Blocks are used for generating the K radio signals respectively.

18. The method according to claim 16, wherein the method comprises: transmitting K0 piece(s) of information, wherein the K0 piece(s) of information is(are) used for determining the K time-frequency resource groups, and the K0 is a positive integer not greater than the K; the K0 is equal to the K and the K0 pieces of information are used for determining the K time-frequency resource groups respectively, or, the K0 is equal to 1 and a second bit block is used for generating any one of the K radio signals.

19. The method according to claim 16, wherein the phrase that the first signaling corresponds to a first type or a second type refers that: a signaling format of the first signaling is the first type or the second type; the first type and the second type are two different signaling formats, and both the first type and the second type are signaling formats for scheduling of PUSCH.

20. The method according to claim 16, wherein J time-frequency resource groups are all time-frequency resource groups overlapping with the first time-frequency resource group in time domain among the K time-frequency resource groups, the J is equal to the K.

* * * * *